United States Patent
Lancioni et al.

(10) Patent No.: US 12,511,393 B2
(45) Date of Patent: Dec. 30, 2025

(54) METHODS, APPARATUS, AND ARTICLES OF MANUFACTURE TO IMPROVE OFFLOADING OF MALWARE SCANS

(71) Applicant: McAfee, LLC, San Jose, CA (US)

(72) Inventors: German Lancioni, San Jose, CA (US); Adrian M. Dunbar, London (GB); Michael Hughes, San Francisco, CA (US); Cedric Cochin, Portland, OR (US); Carl David Woodward, San Jose, CA (US)

(73) Assignee: McAfee, LLC, San Jose, CA (US)

(*) Notice: Subject to any disclaimer, the term of this patent is extended or adjusted under 35 U.S.C. 154(b) by 249 days.

(21) Appl. No.: 18/305,117

(22) Filed: Apr. 21, 2023

(65) Prior Publication Data

US 2024/0354409 A1    Oct. 24, 2024

(51) Int. Cl.
G06F 21/56 (2013.01)

(52) U.S. Cl.
CPC .......... *G06F 21/567* (2013.01); *G06F 21/564* (2013.01); *G06F 21/566* (2013.01); *G06F 2209/509* (2013.01)

(58) Field of Classification Search
CPC .... G06F 21/567; G06F 21/564; G06F 21/566; G06F 2209/509
See application file for complete search history.

(56) References Cited

U.S. PATENT DOCUMENTS

| | | | |
|---|---|---|---|
| 9,690,928 B2 | 6/2017 | Saxena et al. | |
| 10,073,972 B2 | 9/2018 | Saxena et al. | |
| 2013/0047155 A1* | 2/2013 | Caspole | G06F 9/5055 718/1 |
| 2014/0237477 A1* | 8/2014 | Cadambi | G06F 9/5044 718/103 |
| 2016/0117497 A1* | 4/2016 | Saxena | G06F 21/566 726/26 |
| 2016/0117498 A1 | 4/2016 | Saxena et al. | |
| 2016/0283284 A1* | 9/2016 | Sun | G06F 1/329 |
| 2016/0328562 A1 | 11/2016 | Saxena et al. | |

(Continued)

OTHER PUBLICATIONS

Y.-D. Lin, E. T.-H. Chu, Y.-C. Lai and T.-J. Huang, "Time-and-Energy-Aware Computation Offloading in Handheld Devices to Coprocessors and Clouds," in IEEE Systems Journal, vol. 9, No. 2, pp. 393-405, Jun. 2015, doi: 10.1109/JSYST.2013.2289556 (Year: 2015).*

(Continued)

*Primary Examiner* — Robert B Leung
(74) *Attorney, Agent, or Firm* — Hanley, Flight & Zimmerman, LLC

(57) ABSTRACT

Methods, apparatus, systems, and articles of manufacture are disclosed to improve offloading of malware scans. An example apparatus is to, based on a trigger to perform a scan of a volume of data, estimate a computational burden associated with performing the scan using the CPU, the volume of data representative of at least one of a file or an object. Additionally, the example apparatus is to determine whether the computational burden satisfies a threshold associated with offloading the scan to the GPU. The example apparatus is also to cause at least one of the CPU or the GPU to perform the scan based on whether the computational burden satisfies the threshold.

20 Claims, 10 Drawing Sheets

(56) References Cited

U.S. PATENT DOCUMENTS

2016/0378570 A1* 12/2016 Ljubuncic ............. G06F 9/5027
718/104
2017/0061566 A1* 3/2017 Min .................... H04L 43/0817

OTHER PUBLICATIONS

R. Velea and Ş. Drăgan, "CPU/GPU Hybrid Detection for Malware Signatures," 2017 International Conference on Computer and Applications (ICCA), Doha, Qatar, 2017, pp. 85-89, doi: 10.1109/COMAPP. 2017.8079736. (Year: 2017).*

S. Alsubaihi and J.-L. Gaudiot, "A Runtime Workload Distribution with Resource Allocation for CPU-GPU Heterogeneous Systems," 2017 IEEE International Parallel and Distributed Processing Symposium Workshops (IPDPSW), Lake Buena Vista, FL, USA, 2017, pp. 994-1003, doi: 10.1109/IPDPSW.2017.19. (Year: 2017).*

D. Deyannis et al. "Enabling gpu-assisted antivirus protection on android devices through edge offloading." Proceedings of the 1st International Workshop on Edge Systems, Analytics and Networking. 2018. (Year: 2018).*

Jacob, N. and Brodley, C., Dec. 2006. Offloading IDS Computation to the GPU. In 2006 22nd Annual Computer Security Applications Conference (ACSAC'06) (pp. 371-380). IEEE. (Year: 2006).*

Hachman, "Microsoft releases DirectStorage, the future of fast-loading PC games," PCWorld, Mar. 14, 2022, [https://www.pcworld.com/article/623036/microsoft-releases-directstorage-the-future-of-fast-loading-pc-games.html] retrieved on Dec. 21, 2022, 7 pages.

Qasaimeh et al., "Comparing Energy Efficiency of CPU, GPU and FPGA Implementations for Vision Kernels," IEEE, arXiv:1906.11879v1 [cs.CV], May 31, 2019, 8 pages.

Wikipedia, "DirectCompute," Wikipedia Foundation, Inc., Feb. 18, 2022, [https://en.wikipedia.org/w/index.php?title=DirectCompute&oldid=1072659557] retrieved on Dec. 21, 2022, 2 pages.

Microsoft, "BypassIO for Filter Drivers," Microsoft, Dec. 14, 2021, [https://learn.microsoft.com/en-us/windows-hardware/drivers/ifs/bypassio] retrieved on Mar. 24, 2023, 8 pages.

Microsoft, "DirectStorage Overview," Microsoft, Mar. 15, 2023, [https://learn.microsoft.com/en-us/gaming/gdk/_content/gc/system/overviews/directstorage/directstorage-overview] retrieved on Mar. 24, 2023, 19 pages.

Wikipedia, "General-purpose Computing on Graphics Processing Units," Wikipedia Foundation, Inc., [https://en.wikipedia.org/w/index.php?title=General-purpose_computing_on_graphics_processing_units&oldid=1140923762] retrieved on Feb. 28, 2023, 22 pages.

Mittal, "GPUs: Excellent Performance, But What About Security?," HPCwire, May 31, 2018, [https://www.hpcwire.com/2018/05/31/gpus-excellent-performance-but-what-about-security/] retrieved on Apr. 18, 2023, 19 pages.

Wikipedia, "NVM Express," Wikipedia Foundation, Inc., [https://en.wikipedia.org/w/index.php?title=NVM_Express&oldid=1142160630] retrieved on Feb. 28, 2023, 15 pages.

* cited by examiner

METHODS, APPARATUS, AND ARTICLES OF MANUFACTURE TO IMPROVE OFFLOADING OF MALWARE SCANS

FIELD OF THE DISCLOSURE

This disclosure relates generally to endpoint security and, more particularly, to methods, apparatus, and articles of manufacture to improve offloading of malware scans.

BACKGROUND

Compute platforms often include more than one type of processor circuitry. For example, a compute platform may include a central processor unit (CPU) and a graphics processor unit (GPU). The GPU typically cooperates with a graphics driver to generate an output (e.g., an image or series of images) to be conveyed to a display device (e.g., a monitor or a screen). Compute platforms may also include memory and storage. For example, memory refers to a component of the compute platform that stores data while the compute platform is active (e.g., turned on) whereas storage refers to a component of the compute platform that stores data regardless of whether the compute platform is active. Generally, memory stores data temporarily (e.g., for a period of time shorter than a permanent period of time) while storage stores data permanently (e.g., for a period of time longer than a temporary period time).

Figure 1:
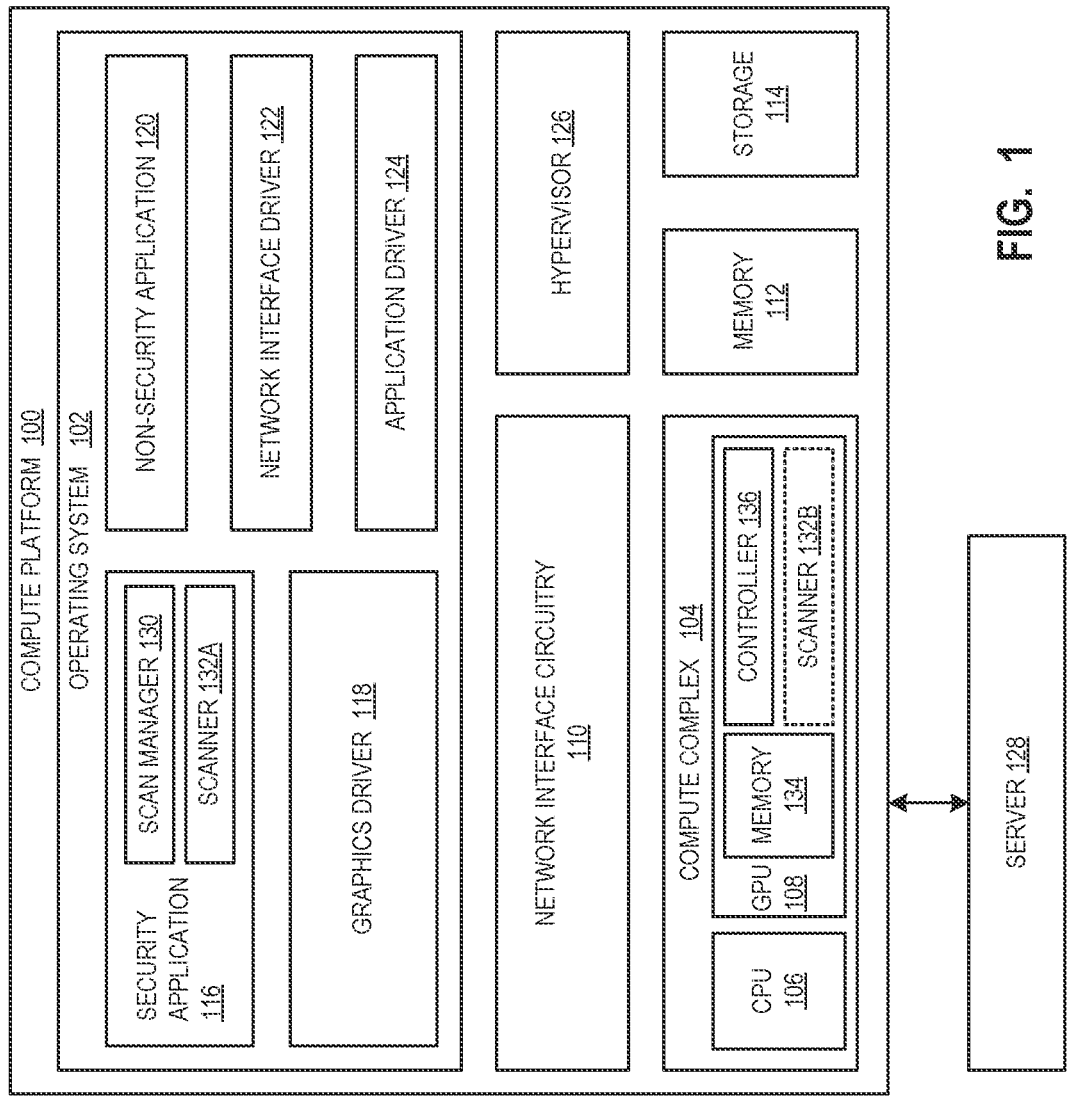
FIG. 1 is an illustration of an example compute platform constructed in accordance with teachings of this disclosure.

In general, the same reference numbers will be used throughout the drawing(s) and accompanying written description to refer to the same or like parts. The figures are not to scale. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special-purpose electrical circuits structured to perform specific operation(s) and including one or more semiconductor-based logic devices (e.g., electrical hardware implemented by one or more transistors), and/or (ii) one or more general-purpose semiconductor-based electrical circuits programmable with instructions to perform specific operations and including one or more semiconductor-based logic devices (e.g., electrical hardware implemented by one or more transistors). Examples of processor circuitry include programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of processor circuitry is/are best suited to execute the computing task(s).

DETAILED DESCRIPTION

To protect a compute platform, antivirus and/or anti-malware software associated with the compute platform scans files and/or objects with which the compute platform interacts. For example, such files and/or objects are stored on the compute platform, transmitted to the compute platform, downloaded to the compute platform, etc. To scan a file and/or an object, antivirus and/or anti-malware software reads a file and/or object from storage (e.g., a hard disk drive (HDD), a solid state drive (SSD), etc.) of a compute platform, loads the file and/or object into memory of the compute platform, and scans the file and/or object for viruses and/or other malware. Relative to other computational tasks, a scan of an individual file and/or object is not a computationally intensive task.

However, to effectively protect a compute platform, antivirus and/or anti-malware software should be able to scan a large volume of files and/or a large volume of objects (e.g., the entire HDD and/or SSD of the compute platform, a compressed object with a large data size, etc.). Such large volume scans require a large amount of computational resources and take a relatively long time to complete as compared to a scan of an individual file and/or object. As such, user experience of the compute platform is degraded (e.g., due to longer wait times) and energy consumption of the compute platform is increased.

One technique to perform a large volume scan utilizes one or more CPUs and memory (e.g., random access memory (RAM)). However, such CPU and memory-based scans are computationally intensive (e.g., consume large amounts of the CPU resources (e.g., threads, cycles, etc.) and/or large amounts of memory (e.g., RAM)) for large volume scans. As such, CPU and memory-based scans degrade the performance of compute platforms implementing such scans because availability of CPU resources and memory of such compute platforms is reduced for other operations of the operating system (OS) of the compute platforms. As described above, the reduced availability of CPU resources and memory degrades user experience.

Additionally, such CPU and memory-based scans expend a large amount of energy for large volume scans. Battery operated compute platforms (e.g., laptops, smartphones, etc.) are particularly impacted by CPU and memory-based scans due to the large amount of energy required to perform large volume scans with the CPU and memory-based approach. Additionally, because viruses and/or other malware operate on the CPU and/or in memory (e.g., RAM), it is possible for a nefarious actor to read the memory (e.g., RAM) and alter results of scans and/or the rules utilized by such CPU and memory-based scans. Accordingly, the security posture of compute platforms implementing CPU and memory-based scans is reduced.

Some techniques to improve upon CPU and memory-based scans have utilized the GPU of a compute platform to perform scanning. Such GPU-based techniques require data to be moved from storage (e.g., an HDD, an SSD, etc.) of a compute platform to memory (e.g., RAM) of the compute platform, and then to memory of the GPU. While such GPU-based techniques achieve benefits (e.g., in terms of scan speed and power efficiency) over CPU and memory-based techniques, such GPU-based techniques may be further improved. For example, such GPU-based techniques inefficiently transfer data to memory of the GPU. Additionally, for example, due to some input/output (I/O) protocols (e.g., according to the Win32 application programming interface (API)), significant percentages (e.g., >90%) of a CPU core can be required in overhead (e.g., the I/O protocols to request data) alone to perform large volume scans under such GPU-based techniques.

Examples disclosed herein accelerate the transfer of data from storage of a compute platform to memory of a GPU. Additionally, examples disclosed herein determine whether the computational benefits of performing a scan with a GPU outweigh the computational burden of transferring data related to the scan to the GPU (e.g., transferring a kernel associated with a security application to the GPU, transferring data to be scanned to the memory of the GPU, etc.). For example, disclosed examples utilize a CPU to estimate a computational burden associated with scanning a batch of files and/or objects with the CPU and when the estimated computational burden satisfies a threshold, disclosed examples utilize the CPU to offload scanning (e.g., pattern matching) of the batch of files and/or objects to a GPU via a double buffering approach.

In this manner, disclosed method, apparatus, and articles of manufacture balance CPU consumption with available GPU load which improves user experience while also accelerating large volume scans in an energy efficient manner. For example, an OS of a compute platform is typically run on a CPU of the compute platform. By reducing the load on the CPU, examples disclosed herein reduce stress on the OS and improve user experience. In addition to the reduced stress on the OS, large volume virus and/or other malware scans are accelerated by executing on the GPU. Furthermore, by performing scans with the GPU, examples disclosed herein improve the security posture of scans. For example, a kernel associated with performing a scan is stored and decrypted within memory of the GPU which is inherently more secure than operating with a CPU and memory.

As such, examples disclosed herein reduce the time required to perform large volume scans while also reducing energy consumption (e.g., by up to three times as compared to other techniques) during large volume scans. By increasing the speed of execution of large volume scans (e.g., enabling faster large volume scans) and reducing energy consumption of large volume scans (e.g., enabling more energy efficient large volume scans), examples disclosed herein improve security of compute platforms by enabling more frequent large volume scans. Additionally, disclosed methods, apparatus, and articles of manufacture improve user experience (e.g., by reducing the time required to perform large volume scans).

FIG. 1 illustrates an example compute platform 100 constructed in accordance with teachings of this disclosure. The example compute platform 100 of FIG. 1 includes an example operating system (OS) 102 and an example compute complex 104. The example compute complex 104 includes an example central processor unit (CPU) 106 and an example graphics processor unit (GPU) 108. Additionally, in the example of FIG. 1, the compute platform 100 includes example network interface circuitry 110, example memory 112, example storage 114, an example security application 116, an example graphics driver 118, an example non-security application 120, an example network interface driver 122, an example application driver 124, and an example hypervisor 126. In the example of FIG. 1, the memory 112 is implemented by volatile memory. For example, the memory 112 is implemented by RAM. In additional or alternative examples, the memory 112 may be implemented by any other type of volatile memory such as Dynamic Random Access Memory (DRAM), Synchronous DRAM (SDRAM), RAMBUS® DRAM (RDRAM®), and/or any other type of RAM device.

In the illustrated example of FIG. 1, the storage 114 is implemented by non-volatile memory constructed in accordance with a Non-Volatile Memory Host Controller Interface Specification (NVMHCIS) provided by NVM Express® (NVMe®). For example, the storage 114 may be implemented by one or more SSDs and/or one or more NAND flash memories constructed in accordance with the NVMHCIS. Non-volatile memory constructed in accordance with the NVMHCIS is generally referred to as Non-Volatile Memory Express (NVMe®) storage. In additional or alternative examples, the storage 114 may be implemented by any other type of non-volatile memory compatible with the NVMHCIS. In the example of FIG. 1, the storage 114 interfaces with the compute platform 100 via a Peripheral Component Interconnect Express (PCIe or PCIE) connection. In some examples, the storage 114 interfaces with the compute platform 100 via a fiber connection.

In the illustrated example of FIG. 1, the compute platform 100 is in communication (e.g., via a network such as the Internet or a private network) with an example server 128. The example server 128 of FIG. 1 is associated with the example security application 116. For example, the example server 128 communicates updates associated with malware-indicative patterns to the security application 116 and/or provides one or more security services (e.g., malware remediation services) to the security application 116).

In the illustrated example of FIG. 1, the security application 116 includes an example scan manager 130 constructed in accordance with teachings of this disclosure. The example scan manager 130 of FIG. 1 facilitates one or more security tasks (e.g., scans for malware-indicative patterns) associated with the security application 116 to protect the example compute platform 100. An example implementation of the scan manager 130 of FIG. 1 is disclosed in detail below in connection with FIG. 2. As disclosed below, the example scan manager 130 of FIG. 1 utilizes the example CPU 106 and/or the example GPU 108 of the compute platform 100 to perform one or more tasks, such as security tasks.

For example, the scan manager 130 of FIG. 1 implements a balancing strategy that improves user experience by reducing consumption of the CPU 106 and memory 112, while speeding up (e.g., reducing the time to perform) security tasks, such as scans for malware-indicative patterns, in an energy efficient manner. In the example of FIG. 1, the scan manager 130 estimates the computational burden associated with performing a security task with the CPU 106. Based on the estimated computational burden of performing the security task with the CPU 106 satisfying a threshold associated with offloading (e.g., providing) at least some of the security task to the GPU 108, the scan manager 130 may offload some or all of the security task to the GPU 108. For example, the scan manager 130 of FIG. 1 offloads one or more scans of one or more files and/or objects to the GPU 108 based on an estimated computational burden of performing the one or more scans with the CPU 106 satisfying the threshold associated with offloading at least some of the one or more scans to the GPU 108.

In the illustrated example of FIG. 1, the graphics driver 118 facilitates interactions between elements of the OS 102 and the GPU 108. Additionally, the graphics driver 118 of FIG. 1 securely provides consumers of the GPU 108 (e.g., applications and/or drivers utilizing the GPU 108 to execute operations) with status notifications associated with tasks offloaded (e.g., provided) to the GPU 108. For example, when the example security application 116 (e.g., via the scan manager 130) offloads a security task to the GPU 108, the example graphics driver 118 of FIG. 1 notifies the security application 116 that the security task has been initiated, that the security task has been completed, that the security task has been preempted, that a particular process has preempted the security task, an identity of the particular process that preempted the security task, and/or any other suitable status information.

Additionally or alternatively, when the non-security application 120 offloads a non-security task to the GPU 108, the example graphics driver 118 of FIG. 1 securely provides the non-security application 120 with status notifications associated with the non-security task offloaded to the GPU 108. For example, the graphics driver 118 of FIG. 1 notifies the non-security application 120 that the non-security task has been initiated, that the non-security task has been completed, that the non-security task has been preempted, that a particular process has preempted the non-security task, an identity of the particular process that preempted the non-security task, and/or any other suitable status information. Notably, the example graphics driver 118 of FIG. 1 provides notifications (e.g., to the security application 116 and/or the non-security application 120) in a secure manner (e.g., at a privilege level enjoyed only by trusted components) such that the information of the notifications cannot be used maliciously by, for example, malware.

In the illustrated example of FIG. 1, consumers (e.g., the security application 116 or the non-security application 120) of the GPU 108 can utilize the status information provided by the example graphics driver 118 in any suitable manner including, for example, enhancing malware detection capability of the security application 116. Further, the example graphics driver 118 of FIG. 1 enables the consumers of the GPU 108 to provide schedule and/or priority assignments to tasks offloaded to the GPU 108. As such, the example graphics driver 118 of FIG. 1 enables components utilizing the GPU 108 (e.g., the security application 116 and/or the non-security application 120) to assign a priority level to tasks destined for or already being executed by the GPU 108 based on, for example, an importance of the task.

Additionally or alternatively, the graphics driver 118 cooperates with the example application driver 124 to protect the offloading of tasks to the GPU 108 (e.g., as facilitated by the example scan manager 130). In the example of FIG. 1, the application driver 124 is associated with the example security application 116. In the example of FIG. 1, the graphics driver 118 and the application driver 124 establish a mutual authentication to ensure that the process of offloading tasks to the GPU 108 and the corresponding data are protected (e.g., by only being handled by trusted components). In the example of FIG. 1, the hypervisor 126 utilizes the privilege level of the hypervisor 126 to monitor components handling the offload process and the corresponding data. For example, the hypervisor 126 monitors a segment (e.g., an isolated segment) of the memory 112 dedicated to tasks offloaded to the GPU 108 and/or internal memory of the GPU 108. Additionally or alternatively, the hypervisor 126 executes one or more checks or verifications in response to attempts to access the segment of the memory 112 and/or the internal memory of the GPU 108.

In the illustrated example of FIG. 1, the network interface driver 122 facilitates interactions between elements of the compute platform 100 (e.g., the OS 102). Additionally, the example network interface driver 122 of FIG. 1 cooperates with the example network interface circuitry 110 to send and receive information related to security operations over a network (e.g., the Internet) to and from other compute platforms (e.g., endpoint devices and/or network nodes that collect information from endpoint devices). To enhance security operations associated with, for example, the security application 116, the example network interface driver 122 of FIG. 1 receives data from the other compute platforms regarding potential malware detected on those other compute platforms. For example, one or more patterns detected on one or more of the other compute platforms may be conveyed to the network interface circuitry 110 in real time (e.g., without delay or as soon as reasonably possible).

In the illustrated example of FIG. 1, the network interface driver 122 receives the information from other compute platforms and makes the information available to, for example, the security application 116 in real time (e.g., without delay or as soon as reasonably possible). As such, the example network interface driver 122 of FIG. 1 receives the malware-indicative information when the corresponding malware is likely active on the network and, thus, likely active on the example compute platform 100. Accordingly, the example network interface driver 122 of FIG. 1 increases and/or improves an ability of, for example, the security application 116 of FIG. 1 to detect malware while the malware is active and unobfuscated (e.g., unpacked or decrypted). The example network interface driver 122 of FIG. 1 facilitates the exchange of data associated with security tasks being executed or security tasks to be executed on any suitable component, such as the CPU 106 and/or the GPU 108.

In the illustrated example of FIG. 1, the security application 116 includes an example scanner 132A/132B (also referred to herein as a malware scanner). For example, the security application 116 includes an example first instance 132A of the scanner 132A/132B. The example scanner 132A/132B of FIG. 1 can be utilized (e.g., called) by, for example, the security application 116 to scan one or more files and/or objects. In some examples, the scanner 132A/132B is implemented outside of the example security application 116 and is accessible to any other suitable application associated with the computing platform 100.

In some examples, the GPU 108 executes operations of the scanner 132A/132B. For example, the GPU 108 executes an example second instance 132B of the scanner 132A/132B. The example second instance 132B of the scanner 132A/132B of FIG. 1 is implemented by a kernel running on the GPU 108. In the example of FIG. 1, the second instance 132B of the scanner 132A/132B is implemented by a kernel developed in accordance with the DirectCompute application programming interface (API) provided by Microsoft Corporation. In additional or alternative examples, the second instance 132B of the scanner 132A/132B is implemented by a kernel developed in accordance with the OpenCL® API provided by Apple, Inc., the CUDA® (Computer Unified Device Architecture) API provided by NVIDIA Corporation, and/or any other API that supports general-purpose computing on GPUs (GPGPU).

In the illustrated example of FIG. 1, the scanner 132A/132B selects one or more files and/or objects to be processed (e.g., scanned) by the scanner 132A/132B. For example, a user interfacing with the security application 116 may identify (e.g., to the scan manager 130) one or more files and/or objects to be scanned by the scanner 132A/132B. In such examples, the user may submit a request to the scan manager 130 to perform a scan of a volume of data representative of file(s) and/or object(s) identified by the user. Additionally or alternatively, the security application 116 may be configured to perform scans of one or more files and/or objects independent of user action. For example, the security application 116 may be configured to run scheduled scans of the compute platform 100 to regularly verify the security of the compute platform 100. In such examples, the security application 116 may submit a request to the scan manager 130 to perform a scan of a volume of data representative of file(s) and/or object(s) identified for the scheduled scan.

In the illustrated example of FIG. 1, the scan manager 130 designates which file(s) and/or object(s) to monitor by, for example, providing, to the scanner 132A/132B, an identifier and/or a name associated with the file(s) and/or object(s). The scan manager 130 may also further specify portions and/or aspects of the selected file(s) and/or object(s) to be monitored by the scanner 132A/132B. For example, the scan manager 130 may cause the scanner 132A/132B to monitor an address range or module name associated with a particular selected file and/or object that corresponds to a particular aspect of the selected file and/or object.

As described above, in some examples, the CPU 106 and/or the GPU 108 execute operations of the scanner 132A/132B. In examples where the CPU 106 implements the scanner 132A/132B (e.g., the CPU 106 executes and/or instantiates the first instance 132A of the scanner 132A/132B), the scanner 132A/132B maps the region(s) of the memory 112 to a virtual address space associated with the scanner 132A/132B. As the respective portions of the memory 112 corresponding to the different files and/or objects are processed, the scanner 132A/132B maps additional portions of the memory 112 associated with the files and/or objects to the virtual address space. To scan the file(s) and/or object(s) represented in the virtual address space, the CPU 106 searches the virtual address space for patterns such as, for example, malware-indicative patterns.

Additionally or alternatively, in examples where the GPU 108 implements the scanner 132A/132B (e.g., the GPU 108 executes and/or instantiates the second instance 132B of the scanner 132A/132B), the scan manager 130 pushes (e.g., offloads) the second instance 132B of the scanner 132A/132B to the GPU 108. In the example of FIG. 1, when the scan manager 130 pushes (e.g., offloads) the second instance 132B of the scanner 132A/132B to the GPU 108, the scan manager 130 also causes data related to a scan to be transferred from the storage 114 to memory of the GPU 108. For example, the scan manager 130 transfers data from the storage 114 to memory of the GPU 108 (e.g., a buffer in memory of the GPU 108) via the DirectStorage API provided by Microsoft Corporation. In additional or alternative examples, the scan manager 130 transfers data from the storage 114 to memory of the GPU 108 via the Fast Resource Loading API provided by Apple, Inc., and/or any other API that supports improved transferring of data from storage of a compute platform to memory of a GPU.

In the illustrated example of FIG. 1, the GPU 108 includes example GPU memory 134, an example controller 136, and one or more compute cores (not illustrated). In the example of FIG. 1, although the GPU 108 is illustrated as a single GPU, it should be noted that the GPU 108 may be implemented by one or more GPUs. For example, in some examples, the GPU 108 may be implemented by an integrated GPU (e.g., integrated in the same package as the CPU 106) and/or a discrete GPU (e.g., a GPU implemented in a separate package from the CPU 106). In the example of FIG. 1, the GPU memory 134 may be implemented by local memory, one or more shared local memories, video RAM (VRAM), among others. In this manner, data related to tasks offloaded to the GPU 108 may be stored in the GPU memory 134 for processing by the one or more compute cores of the GPU 108.

In the illustrated example of FIG. 1, the controller 136 is constructed in accordance with teachings of this disclosure. The example controller 136 of FIG. 1 facilitates the execution of one or more tasks offloaded to the GPU 108. For example, the controller 136 may partition the GPU memory 134 into one or more buffers to separately store data representative of separate files and/or objects. An example implementation of the controller 136 of FIG. 1 is disclosed in detail below in connection with FIG. 3.

As described above, the scan manager 130 of the security application 116 may offload (e.g., provide) one or more security tasks to the GPU 108. Offloaded security tasks may include a scan of one or more files and/or objects for malware-indicative patterns. In the example of FIG. 1, when a security scan is offloaded to the GPU 108, the kernel implementing the second instance 132B of the scanner 132A/132B may be encrypted. For example, during offloading processes, the security application 116 and/or the graphics driver 118 may encrypt the kernel. As such, after receiving the kernel at the GPU memory 134, the controller 136 decrypts the encrypted kernel (e.g., the encrypted version of the kernel) to obtain the second instance 132B of the scanner 132A/132B.

In the illustrated example of FIG. 1, to implement a security scan, the scan manager 130 loads data representative of file(s) and/or object(s) to be scanned into one or more buffers initialized in the GPU memory 134. Subsequently, the one or more compute cores of the GPU 108 execute the second instance 132B of the scanner 132A/132B. If the scanning performed by the second instance 132B of the scanner 132A/132B (e.g., on the one or more compute cores of the GPU 108) results in one or more matches, the second instance 132B of the scanner 132A/132B returns, for example, one or more corresponding identifiers of one or more files and/or objects. In some examples, the GPU 108 returns the one or more identifiers to the security application 116. As described in detail below, the offloading of security task(s) to the GPU 108 improves the security posture of the compute platform 100 by allowing scans for patterns indicative of malware to be performed in the GPU memory 134 which is more robust, in terms of security than the memory 112.

Figure 2:
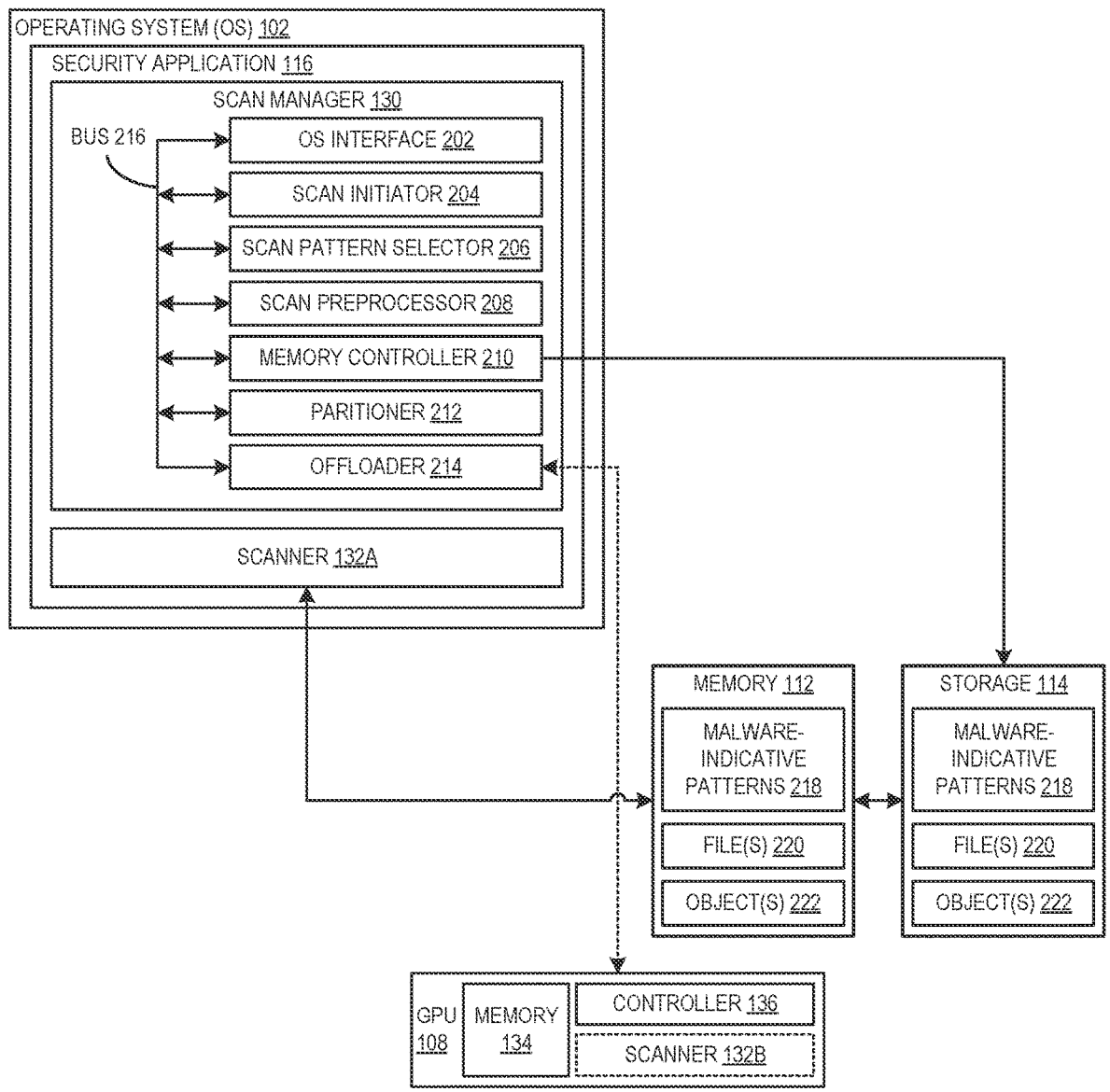
FIG. 2 is a block diagram of an example implementation of the example scan manager of FIG. 1.

FIG. 2 is a block diagram of an example implementation of the example scan manager 130 of FIG. 1. The scan manager 130 of FIG. 2 may be instantiated (e.g., creating an instance of, bring into being for any length of time, materialize, implement, etc.) by processor circuitry such as a central processing unit executing instructions. Additionally or alternatively, the scan manager 130 of FIG. 2 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 2 may, thus, be instantiated at the same or different times. Some or all of the circuitry may be instantiated, for example, in one or more threads executing concurrently on hardware and/or in series on hardware. Moreover, in some examples, some or all of the circuitry of FIG. 2 may be implemented by microprocessor circuitry executing instructions to implement one or more virtual machines and/or containers.

In the illustrated example of FIG. 2, the scan manager 130 includes an example operating system (OS) interface 202, an example scan initiator 204, an example scan pattern selector 206, an example scan preprocessor 208, an example memory controller 210, an example partitioner 212, an example offloader 214, and an example bus 216. In the example of FIG. 2, the OS interface 202, the scan initiator 204, the scan pattern selector 206, the scan preprocessor 208, the memory controller 210, the partitioner 212, and the offloader 214 are in communication with one(s) of each other via the bus 216. For example, the bus 216 can be implemented by at least one of an Inter-Integrated Circuit (I2C) bus, a Serial Peripheral Interface (SPI) bus, a Peripheral Component Interconnect (PCI) bus, or a Peripheral Component Interconnect Express (PCIe or PCIE) bus. Additionally or alternatively, the bus 216 can be implemented by any other type of computing or electrical bus.

As described above, the example security application 116 of FIG. 1 is tasked with protecting the example compute platform 100 from malware and the example scan manager 130 is tasked with managing scans that enable the protection. For example, the scan manager 130 of FIG. 2 maintains a plurality of malware-indicative patterns 218 that have been identified (e.g., by a developer of the security application 116, an entity associated with the example server 128 and/or other compute platforms) as potentially corresponding to the compute platform 100 being infected with malware. Example malware to which the example malware-indicative patterns 218 of FIG. 2 correspond includes obfuscated (e.g., encrypted and/or packed) files, polymorphic malware, and/or file-less malware such as Internet worms, browser exploits, and/or malicious code utilizing reflective dynamic link library (DLL) injection techniques. In the illustrated example of FIG. 2, the malware-indicative patterns 218 utilized by the example security application 116 are populated (e.g., via the server 128) by, for example, an entity associated with the security application 116 such as, for example, a developer of the security application 116.

In the illustrated example of FIG. 2, the scan manager 130 of FIG. 2 facilitates or manages scans (e.g., searches) of one or more elements of the compute platform 100 for the malware-indicative patterns 218 to determine whether the compute platform 100 has a malware problem. For example, the scan manager 130 facilitates scans of one or more example files 220 and/or one or more example objects 222 stored in the storage 114. In the example of FIG. 2, the scan manager 130 includes the OS interface 202 to monitor components of the OS 102 for requests to perform a scan of the compute platform 100. For example, the OS interface 202 monitors the security application 116 for one or more requests to perform a scan of the compute platform 100. Additionally or alternatively, the OS interface 202 of FIG. 2 returns results of scans to components that requested the scans. For example, the OS interface 202 returns one or more results of one or more scans to the security application 116. In some examples, the OS interface 202 is instantiated by processor circuitry executing OS interface instructions and/or configured to perform operations such as those represented by the flowchart of FIG. 5.

In some examples, the scan manager 130 includes means for interfacing. For example, the means for interfacing may be implemented by the OS interface 202. In some examples, the OS interface 202 may be instantiated by processor circuitry such as the example processor circuitry 712 of FIG. 7. For instance, the OS interface 202 may be instantiated by the example microprocessor 800 of FIG. 8 executing machine-executable instructions such as those implemented by at least blocks 502 and 524 of FIG. 5. In some examples, the OS interface 202 may be instantiated by hardware logic circuitry, which may be implemented by an ASIC, XPU, or the FPGA circuitry 900 of FIG. 9 structured to perform operations corresponding to the machine-readable instructions. Additionally or alternatively, the OS interface 202 may be instantiated by any other combination of hardware, software, and/or firmware. For example, the OS interface 202 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine-readable instructions and/or to perform some or all of the operations corresponding to the machine-readable instructions without executing software or firmware, but other structures are likewise appropriate.

In the illustrated example of FIG. 2, the scan manager 130 includes the scan initiator 204 to determine when a scan is to be performed and initiate the scan at the determined time. In some examples, the scan initiator 204 of FIG. 2 determines a frequency and/or schedule for scanning the compute platform 100. For example, the scan initiator 204 bases a frequency and/or timing of scans on a current risk level of the compute platform 100. In such examples, the scan initiator 204 obtains and/or tracks the risk level of the compute platform 100 according to data provided by, for example, one or more firewalls, network appliances, event aggregators, one or more sensors, and/or any other suitable system monitor(s)).

In the illustrated example of FIG. 2, when the current risk level of the compute platform 100 is above a threshold, the scan initiator 204 increases a frequency of the scans. Additionally or alternatively, when the current risk level of the compute platform 100 is below the threshold, the scan initiator 204 decreases or maintains the frequency of the scans. In some examples, the example scan initiator 204 considers intermediate thresholds. Additionally or alternatively, the scan initiator 204 gradually reduces the frequency of the scans if no threats are found in consecutive scans.

In some examples, the scan initiator 204 initiates scans in response to instructions from the security application 116. For example, based on data received from the OS interface 202, the scan initiator 204 determines whether a request (e.g., from the security application 116) to scan the compute platform 100 has been received. Additionally or alternatively, the scan initiator 204 monitors aspects of the compute platform 100 and/or receives data from components of the compute platform 100 related to, for example, one or more conditions that cause concern and, thus, warrant initiation of a scan. In some examples, the scan initiator 204 is instantiated by processor circuitry executing scan initiation instructions and/or configured to perform operations such as those represented by the flowchart of FIG. 5.

In some examples, the scan manager 130 includes means for initiating. For example, the means for initiating may be implemented by the scan initiator 204. In some examples, the scan initiator 204 may be instantiated by processor circuitry such as the example processor circuitry 712 of FIG. 7. For instance, the scan initiator 204 may be instantiated by the example microprocessor 800 of FIG. 8 executing machine-executable instructions such as those implemented by at least block 504 of FIG. 5. In some examples, the scan initiator 204 may be instantiated by hardware logic circuitry, which may be implemented by an ASIC, XPU, or the FPGA circuitry 900 of FIG. 9 structured to perform operations corresponding to the machine-readable instructions. Additionally or alternatively, the scan initiator 204 may be instantiated by any other combination of hardware, software, and/or firmware. For example, the scan initiator 204 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine-readable instructions and/or to perform some or all of the operations corresponding to the machine-readable instructions without executing software or firmware, but other structures are likewise appropriate.

In the illustrated example of FIG. 2, the scan manager 130 includes the scan pattern selector 206 to select one or more of the malware-indicative patterns 218 as the subject(s) of a scheduled scan. In some examples, the scan pattern selector 206 selects all of the malware-indicative patterns 218 based on, for example, the scan being scheduled for a time of relatively low activity on the compute platform 100. In some examples, the scan pattern selector 206 of FIG. 2 selects a random subset of the malware-indicative patterns 218 for the scheduled scan. In some examples, the scan pattern selector 206 of FIG. 2 selects a subset of the malware-indicative patterns 218 based on an event that triggered the scan. Example events include web browser events (e.g., presence of a browser helper object (BHO) or plug-in associated with a web-browser), document events (e.g., presence of documents including macro processing objects), script events (e.g., the presence of scripts in the one or more files 220 and/or the one or more objects 222), suspicious file events (e.g., the presence of a rootkit in the one or more files 220 and/or the one or more objects 222), critical disk region events (e.g., files with code to access a critical disk region (e.g., the master boot record, the volume boot record, or the extensible firmware interface system partition, etc.)), security events detected by external security application(s), among others.

In some examples, the scan pattern selector 206 of FIG. 2 selects one or more of the malware-indicative patterns 218 based on information received from the network interface driver 122 of FIG. 1. For example, the network interface driver 122 receives data from other compute platforms indicating that, for example, a particular one of the malware-indicative patterns 218 is currently active, likely to be active soon, and/or recently active. As such, the example scan pattern selector 206 of FIG. 2 may select the corresponding one(s) of the malware-indicative patterns 218 according the data received via the network interface driver 122. Additionally or alternatively, the example network interface driver 122 of FIG. 1 receives malware-indicative patterns from one or more external compute platforms and provides the received malware-indicative patterns to the example scan pattern selector 206. In some examples, the malware-indicative patterns received via the network interface driver 122 are added to the example malware-indicative patterns 218. In some examples, the scan pattern selector 206 is instantiated by processor circuitry executing scan pattern selecting instructions and/or configured to perform operations such as those represented by the flowchart of FIG. 5.

In some examples, the scan manager 130 includes means for selecting. For example, the means for selecting may be implemented by the scan pattern selector 206. In some examples, the scan pattern selector 206 may be instantiated by processor circuitry such as the example processor circuitry 712 of FIG. 7. For instance, the scan pattern selector 206 may be instantiated by the example microprocessor 800 of FIG. 8 executing machine-executable instructions such as those implemented by at least block 506 of FIG. 5. In some examples, the scan pattern selector 206 may be instantiated by hardware logic circuitry, which may be implemented by an ASIC, XPU, or the FPGA circuitry 900 of FIG. 9 structured to perform operations corresponding to the machine-readable instructions. Additionally or alternatively, the scan pattern selector 206 may be instantiated by any other combination of hardware, software, and/or firmware. For example, the scan pattern selector 206 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine-readable instructions and/or to perform some or all of the operations corresponding to the machine-readable instructions without executing software or firmware, but other structures are likewise appropriate.

In the illustrated example of FIG. 2, the scan manager 130 includes the scan preprocessor 208 to estimate a computational burden of performing a scan with the CPU 106. For example, for a scheduled and/or requested scan of the one or more files 220 and/or the one or more objects 222, the scan preprocessor 208 estimates a computational burden of scanning a volume of data representative of the one or more files 220 and/or the one or more objects 222 with the CPU 106. In the example of FIG. 2, the scan preprocessor 208 estimates example computational burden based on a number of the one or more files 220 and/or the one or more objects 222 represented in the volume of data, the size of the one or more files 220 and/or the one or more objects 222, and/or one or more types (e.g., respective types) of the one or more files 220 and/or the one or more objects 222.

Additional or alternative criteria may be utilized by the scan preprocessor 208 to estimate the computational burden of scanning the volume of data with the CPU 106. For example, the scan preprocessor 208 estimates example computational burden based on hardware capabilities (e.g., a hardware capability, at least one hardware capability, etc.) of the compute platform 100 and/or a current computational burden on the GPU 108 (e.g., is the GPU 108 executing operations related to a game, a movie, etc.). Additionally, the scan preprocessor 208 determines whether an estimated computational burden of performing a scan of a volume of data with the CPU 106 satisfies (e.g., exceeds) a threshold associated with offloading the scan to the GPU 108. In some examples, the scan preprocessor 208 is instantiated by processor circuitry executing scan preprocessing instructions and/or configured to perform operations such as those represented by the flowchart of FIG. 5.

In some examples, the scan manager 130 includes means for preprocessing. For example, the means for preprocessing may be implemented by the scan preprocessor 208. In some examples, the scan preprocessor 208 may be instantiated by processor circuitry such as the example processor circuitry 712 of FIG. 7. For instance, the scan preprocessor 208 may be instantiated by the example microprocessor 800 of FIG. 8 executing machine-executable instructions such as those implemented by at least blocks 508 and 510 of FIG. 5. In some examples, the scan preprocessor 208 may be instantiated by hardware logic circuitry, which may be implemented by an ASIC, XPU, or the FPGA circuitry 900 of FIG. 9 structured to perform operations corresponding to the machine-readable instructions. Additionally or alternatively, the scan preprocessor 208 may be instantiated by any other combination of hardware, software, and/or firmware. For example, the scan preprocessor 208 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine-readable instructions and/or to perform some or all of the operations corresponding to the machine-readable instructions without executing software or firmware, but other structures are likewise appropriate.

In the illustrated example of FIG. 2, the scan manager 130 includes the memory controller 210 to transfer data from the storage 114 to the memory 112 and/or the GPU memory 134. For example, based on (e.g., in response to) the scan preprocessor 208 determining that the computational burden of performing a scan with the CPU 106 does not satisfy (e.g., does not exceed) the threshold associated with offloading the scan to the GPU 108, the memory controller 210 transfers a volume of data from the storage 114 to the memory 112 to facilitate scanning by the CPU 106. Subsequently, the CPU 106 executes the first instance 132A of the scanner 132A/132B to scan the one or more files 220 and/or the one or more objects 222 represented in the volume of data transferred to the memory 112. As described above, in some examples, the memory controller 210 is instantiated by processor circuitry executing memory controlling instructions and/or configured to perform operations such as those represented by the flowchart of FIG. 5.

In some examples, the scan manager 130 includes means for controlling. For example, the means for controlling may be implemented by the memory controller 210. In some examples, the memory controller 210 may be instantiated by processor circuitry such as the example processor circuitry 712 of FIG. 7. For instance, the memory controller 210 may be instantiated by the example microprocessor 800 of FIG. 8 executing machine-executable instructions such as those implemented by at least blocks 512 and 520 of FIG. 5. In some examples, the memory controller 210 may be instantiated by hardware logic circuitry, which may be implemented by an ASIC, XPU, or the FPGA circuitry 900 of FIG. 9 structured to perform operations corresponding to the machine-readable instructions. Additionally or alternatively, the memory controller 210 may be instantiated by any other combination of hardware, software, and/or firmware. For example, the memory controller 210 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine-readable instructions and/or to perform some or all of the operations corresponding to the machine-readable instructions without executing software or firmware, but other structures are likewise appropriate.

In the illustrated example of FIG. 2, the scan manager 130 includes the partitioner 212 to partition a volume of data to be scanned into two or more portions. In this manner, the first instance 132A of the scanner 132A/132B may be executed by the CPU 106 and the second instance 132B of the scanner 132A/132B may be executed by the GPU 108 to process (e.g., scan) the two or more partitions of the data in parallel. In the example of FIG. 2, the partitioner 212 determines whether to partition a volume of data to be scanned to improve the computational efficiency of performing the scan of the compute platform 100. For example, the partitioner 212 may partition data to be scanned for energy management purposes.

In the illustrated example of FIG. 2, the partitioner 212 determines whether to partition a volume of data to be scanned based on an estimation of the computational burden of performing the scan with the CPU 106 and/or the extent to which the computational burden satisfies (e.g., exceeds) the threshold associated with offloading the scan to the GPU 108. Additionally or alternatively, the partitioner 212 determines whether to partition data to be scanned based on a current computational burden of the CPU 106. For example, the partitioner 212 evaluates whether the CPU 106 is currently performing (or is scheduled to perform) one or more CPU-oriented tasks such as document creation, web browsing, and/or general OS tasks. If the CPU 106 is currently performing (or is scheduled to perform) one or more CPU-oriented tasks, the partitioner 212 may determine not to partition the volume of data to be scanned. For example, such a decision may be based on a determination that the CPU 106 is currently (or will soon be) burdened by one or more CPU-oriented tasks.

In some examples, the partitioner 212 determines whether to partition data to be scanned based on additional or alternative criteria. For example, the partitioner 212 considers the number of the one or more files 220 and/or the one or more objects 222. Additionally or alternatively, the partitioner 212 considers the one or more sizes (e.g., respective sizes) of the one or more files 220 and/or the one or more objects 222. For example, a large file may be more efficiently scanned on the GPU 108 and a smaller file may be scanned more efficiently on the CPU 106. In some examples, the partitioner 212 partitions a volume of data such that the volume of data may be scanned by multiple GPUs. As described above, in some examples, the GPU 108 may be implemented by an integrated GPU and a discrete GPU. In such examples, the partitioner 212 may determines whether to partition a volume of data to be scanned by the CPU 106 and/or the two or more GPUs. In some examples, the partitioner 212 is instantiated by processor circuitry executing partitioning instructions and/or configured to perform operations such as those represented by the flowchart of FIG. 5.

In some examples, the scan manager 130 includes means for partitioning. For example, the means for partitioning may be implemented by the partitioner 212. In some examples, the partitioner 212 may be instantiated by processor circuitry such as the example processor circuitry 712 of FIG. 7. For instance, the partitioner 212 may be instantiated by the example microprocessor 800 of FIG. 8 executing machine-executable instructions such as those implemented by at least block 516 of FIG. 5. In some examples, the partitioner 212 may be instantiated by hardware logic circuitry, which may be implemented by an ASIC, XPU, or the FPGA circuitry 900 of FIG. 9 structured to perform operations corresponding to the machine-readable instructions. Additionally or alternatively, the partitioner 212 may be instantiated by any other combination of hardware, software, and/or firmware. For example, the partitioner 212 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine-readable instructions and/or to perform some or all of the operations corresponding to the machine-readable instructions without executing software or firmware, but other structures are likewise appropriate.

In the illustrated example of FIG. 2, the scan manager 130 includes the offloader 214 to offload (e.g., provide) the scanner 132A/132B to the GPU 108. For example, based on (e.g., in response to) the scan preprocessor 208 determining that the computational burden of performing a scan with the CPU 106 satisfies (e.g., exceeds) the threshold associated with offloading the scan to the GPU 108, the offloader 214 offloads (e.g., provides) the scanner 132A/132B to the GPU 108. Stated differently, based on a determination that the GPU will scan (e.g., the GPU 108 will scan) the first portion of the volume of data more efficiently than the CPU 106, the offloader 214 offloads the scanner 132A/132B to the GPU (e.g., the GPU 108). For example, the offloader 214 pushes an encrypted kernel corresponding to the scanner 132A/132B (e.g., the second instance 132B of the scanner 132A/132B) to the GPU 108. To offload the scanner 132A/132B to the GPU 108, the offloader 214 cooperates with the example graphics driver 118 of FIG. 1. Additionally, as described below, the offloader 214 coordinates with the memory controller 210 to transfer data related to a scan from the storage 114 to the GPU memory 134.

In the illustrated example of FIG. 2, the offloader 214 can offload selective ones of the scans and/or selective aspects of certain scans to the GPU 108, while tasking the CPU 106 with executing other ones of the scans and/or other aspects of the certain scans. For example, scans offloaded to the GPU 108 and scans reserved for the CPU 106 correspond to the partitions of related data as determined by the partitioner 212. In such examples, the memory controller 210 coordinates with the offloader 214 to transfer data related to the selected ones of the scans and/or selected aspects of certain scans from the storage 114 to the GPU memory 134. In some examples, the offloader 214 of FIG. 2 selects which one(s) of the scans to offload to the GPU 108 based on a current workload of the CPU 106 and/or a current workload of the GPU 108. Additionally or alternatively, the example offloader 214 of FIG. 2 selects which one(s) of the scans to offload to the GPU 108 based on a type and/or size of the one or more files 220 and/or the one or more objects 222 to be scanned.

In some examples, the offloader 214 can offload scans to one or more GPUs. As described above, in some examples, the GPU 108 may be implemented by an integrated GPU and a discrete GPU. In such examples, the offloader 214 determines which of the GPUs to offload a scan to based on a current workload of the integrated GPU and a current workload of the discrete GPU. For example, if the integrated GPU is not as burdened as the discrete GPU, then the offloader 214 may elect to offload a scan to the integrated GPU despite the fact that the integrated GPU may be slower than the discrete GPU (e.g., in terms of time required to perform a process). As such, the offloaded scan would be performed more efficiently by the integrated GPU than by the discrete GPU based on the current workloads of the GPUs.

In the illustrated example of FIG. 2, when a scan has been configured (e.g., the time of execution is scheduled, the scan patterns to be searched are selected, and the target file(s) and/or object(s) is/are selected), the example offloader 214 facilitates offloading of the scan task to the example GPU 108. In response, the GPU 108 executes the second instance 132B of the scanner 132A/132B to perform the scan. Additionally, the offloader 214 instructs the GPU 108 (e.g., via the graphics driver 118) to provide results of offloaded scans to the security application 116. That is, the security application 116 is informed that a scan found one or more of the malware-indicative patterns 218 or did not find any of the malware-indicative patterns 218.

In the illustrated example of FIG. 2, if one or more of the malware-indicative patterns 218 are found during the scans executed by the GPU 108, the example security application 116 takes any suitable remedial action(s). For example, the security application 116 mitigates, alleviates, and/or removes malware from the compute platform 100. Example notification between the GPU 108 and the security application 116 is facilitated by the offloader 214 accessing one or more results of the scans and the OS interface 202 communicating the one or more results to the security application 116 as described above. In some examples, the offloader 214 is instantiated by processor circuitry executing offloading instructions and/or configured to perform operations such as those represented by the flowchart of FIG. 5.

In some examples, the scan manager 130 includes means for offloading. For example, the means for offloading may be implemented by the offloader 214. In some examples, the offloader 214 may be instantiated by processor circuitry such as the example processor circuitry 712 of FIG. 7. For instance, the offloader 214 may be instantiated by the example microprocessor 800 of FIG. 8 executing machine-executable instructions such as those implemented by at least blocks 518 and 522 of FIG. 5. In some examples, the offloader 214 may be instantiated by hardware logic circuitry, which may be implemented by an ASIC, XPU, or the FPGA circuitry 900 of FIG. 9 structured to perform operations corresponding to the machine-readable instructions. Additionally or alternatively, the offloader 214 may be instantiated by any other combination of hardware, software, and/or firmware. For example, the offloader 214 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine-readable instructions and/or to perform some or all of the operations corresponding to the machine-readable instructions without executing software or firmware, but other structures are likewise appropriate.

Figure 3:
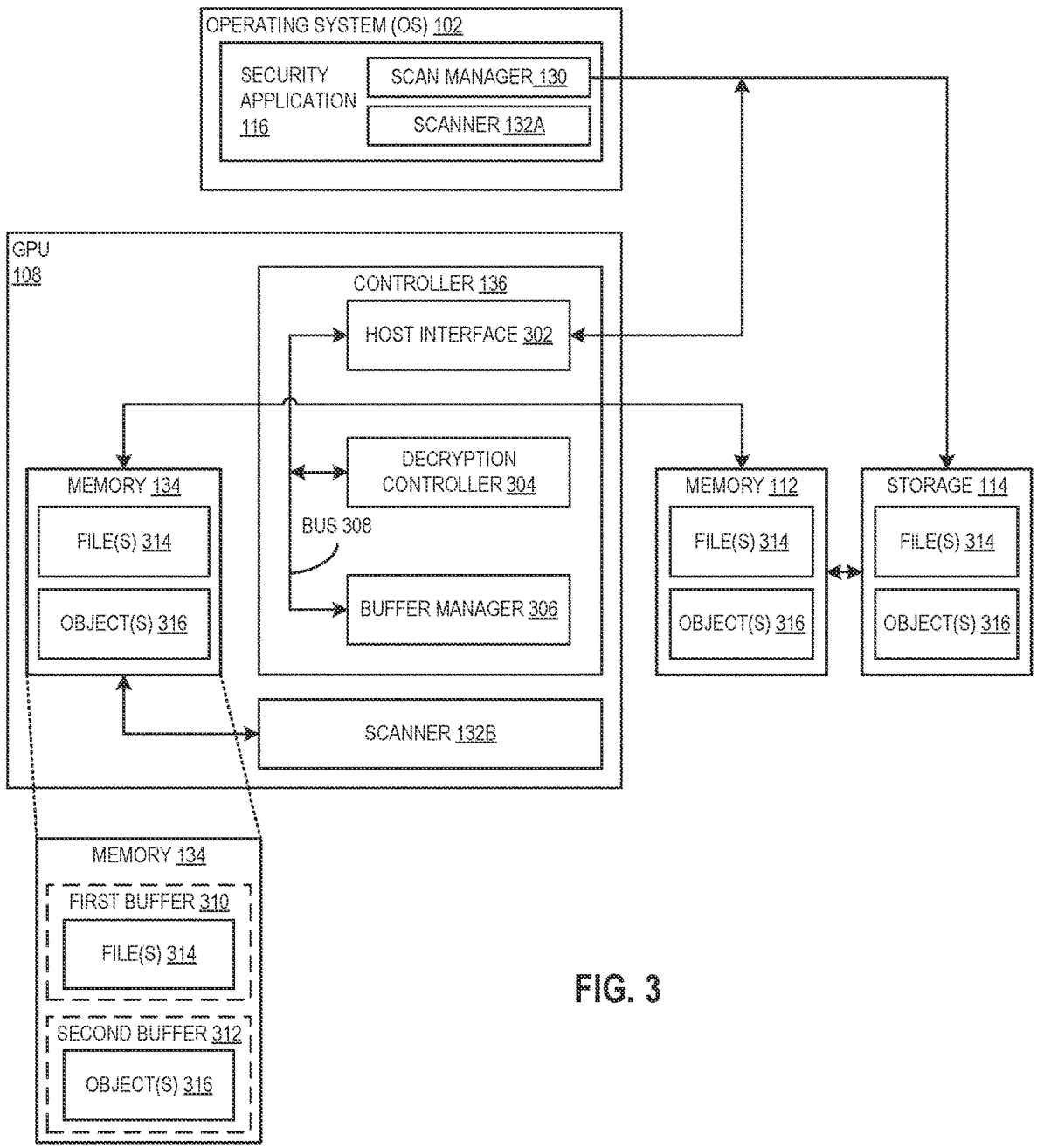
FIG. 3 is a block diagram of an example implementation of the example controller of FIG. 1.

FIG. 3 is a block diagram of an example implementation of the example controller 136 of FIG. 1. The controller 136 of FIG. 3 may be instantiated (e.g., creating an instance of, bring into being for any length of time, materialize, implement, etc.) by processor circuitry such as a central processing unit executing instructions. Additionally or alternatively, the controller 136 of FIG. 3 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 3 may, thus, be instantiated at the same or different times. Some or all of the circuitry may be instantiated, for example, in one or more threads executing concurrently on hardware and/or in series on hardware. Moreover, in some examples, some or all of the circuitry of FIG. 3 may be implemented by microprocessor circuitry executing instructions to implement one or more virtual machines and/or containers.

In the illustrated example of FIG. 3, the controller 136 includes an example host interface 302, an example decryption controller 304, an example buffer manager 306, and an example bus 308. In the example of FIG. 3, the host interface 302, the decryption controller 304, the buffer manager 306 are in communication with one(s) of each other via the bus 308. For example, the bus 308 can be implemented by at least one of an I2C bus, a SPI bus, a PCI bus, or a PCIe (or PCIE) bus. Additionally or alternatively, the bus 308 can be implemented by any other type of computing or electrical bus.

As described above, in some examples, the scan manager 130 offloads the scanner 132A/132B to the GPU 108. For example, the offloader 214 of FIG. 2 offloads the scanner 132A/132B to the GPU 108 based on (e.g., in response to) the scan preprocessor 208 of FIG. 2 determining that the computational burden of performing a scan with the CPU 106 satisfies (e.g., exceeds) the threshold associated with offloading the scan to the GPU 108. In the example of FIG. 3, the controller 136 includes the host interface 302 to interface with OS 102 and/or other components of the compute platform 100 (e.g., the storage 114). For example, the host interface 302 accesses one or more kernels offloaded to the GPU 108 from the security application 116 and/or the graphics driver 118. As described above, kernels offloaded to the GPU 108 may be offloaded in an encrypted format.

In the illustrated example of FIG. 3, the host interface 302 also returns one or more results of offloaded tasks to the consumer that offloaded the task to the GPU 108. For example, the host interface 302 returns one or more result of a scan of one or more files and/or objects to the offloader 214 of FIG. 2. In some examples, the host interface 302 accesses components of the OS 102 and/or compute platform 100 based on a request (e.g., an instruction) from other components of the controller 136 of FIG. 3. Additionally or alternatively, the host interface 302 forwards communications to other components of the controller 136 of FIG. 3. In some examples, the host interface 302 is instantiated by processor circuitry executing interfacing instructions and/or configured to perform operations such as those represented by the flowchart of FIG. 6.

In some examples, the controller 136 includes means for interfacing. For example, the means for interfacing may be implemented by the host interface 302. In some examples, the host interface 302 may be instantiated by processor circuitry such as the example graphics processor circuitry 734 of FIG. 7. For instance, the host interface 302 may be instantiated by the example interface circuitry 736 of FIG. 7 executing machine-executable instructions such as those implemented by at least blocks 602 and 618 of FIG. 6. In some examples, the host interface 302 may be instantiated by hardware logic circuitry, which may be implemented by an ASIC, XPU, or the FPGA circuitry 900 of FIG. 9 (e.g., the general-purpose programmable circuitry 918) structured to perform operations corresponding to the machine-readable instructions. Additionally or alternatively, the host interface 302 may be instantiated by any other combination of hardware, software, and/or firmware. For example, the host interface 302 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine-readable instructions and/or to perform some or all of the operations corresponding to the machine-readable instructions without executing software or firmware, but other structures are likewise appropriate.

In the illustrated example of FIG. 3, the controller 136 includes the decryption controller 304 to decrypt one or more kernels offloaded to the GPU 108. As described above, kernels offloaded to the GPU 108 may be encrypted during offloading processes. For example, the security application 116 and/or the graphics driver 118 encrypt the second instance 132B of the scanner 132A/132B during offloading processes. As such, after receiving a kernel at the GPU memory 134, the decryption controller 304 decrypts the encrypted kernel to obtain an unencrypted kernel corresponding to the offloaded task. For example, based on receiving an encrypted corresponding to the second instance 132B of the scanner 132A/132B, the decryption controller 304 decrypts the second instance 132B of the scanner 132A/132B in the GPU memory 134. In some examples, the decryption controller 304 is instantiated by processor circuitry executing decryption instructions and/or configured to perform operations such as those represented by the flowchart of FIG. 6.

In some examples, the controller 136 includes means for decrypting. For example, the means for decrypting may be implemented by the decryption controller 304. In some examples, the decryption controller 304 may be instantiated by processor circuitry such as the example graphics processor circuitry 734 of FIG. 7. For instance, the decryption controller 304 may be instantiated by the example control circuitry 738 of FIG. 7 executing machine-executable instructions such as those implemented by at least block 604 of FIG. 6. In some examples, the decryption controller 304 may be instantiated by hardware logic circuitry, which may be implemented by an ASIC, XPU, or the FPGA circuitry 900 of FIG. 9 (e.g., the general-purpose programmable circuitry 918) structured to perform operations corresponding to the machine-readable instructions. Additionally or alternatively, the decryption controller 304 may be instantiated by any other combination of hardware, software, and/or firmware. For example, the decryption controller 304 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine-readable instructions and/or to perform some or all of the operations corresponding to the machine-readable instructions without executing software or firmware, but other structures are likewise appropriate.

In the illustrated example of FIG. 3, the controller 136 includes the buffer manager 306 to manage the GPU memory 134 during processing of tasks offloaded to the GPU 108. For example, when security task (e.g., a scan) is offloaded to the GPU 108, the buffer manager 306 of FIG. 3 initializes an example first buffer 310 and an example second buffer 312 in the GPU memory 134. As described above, the memory controller 210 of the scan manager 130 transfers data from the storage 114 to the GPU memory 134. For example, the memory controller 210 of the scan manager 130 causes one or more example files 314 and/or one or more example objects 316 to be transferred from the storage 114 to the GPU memory 134. For example, the memory controller 210 of the scan manager 130 cause a first file and/or object represented in data to be scanned to be streamed from the storage 114 to the first buffer 310.

In the illustrated example of FIG. 3, the memory controller 210 of the scan manager 130 utilizes the DirectStorage API to stream data (representative of a first one of the one or more files 314) from the storage 114 to the first buffer 310 in the GPU memory 134. For example, the memory controller 210 of the scan manager 130 utilizes the DirectStorage API to instruct the storage 114 to transfer data to the memory 112 and then to the first buffer 310 of the GPU memory 134. By utilizing the DirectStorage API, the memory controller 210 of the scan manager 130 transfers data from the storage 114 to the GPU memory 134. As such, the OS 102 improves (e.g., optimizes) I/O requests to the storage 114 thereby reducing the computational burden on the CPU 106. For example, by utilizing the DirectStorage API, the memory controller 210 of the scan manager 130 can couple (e.g., batch) multiple I/O requests together to reduce the computational burden on the CPU 106. Additionally, for example, the scan manager 130 can batch a large number of small files and/or objects. Once the first buffer 310 is filled with first data (representative of a first one of the one or more files 314), the one or more compute cores of the GPU 108 executes the second instance 132B of the scanner 132A/132B to scan the first data. While the second instance 132B of the scanner 132A/132B scans the first data stored in the first buffer 310, the memory controller 210 of the scan manager 130 causes second data (e.g., data representative of a first one of the one or more objects 316) to be streamed from the storage 114 to the second buffer 312. For example, the memory controller 210 of the scan manager 130 utilizes the DirectStorage API to stream data (representative of a first one of the one or more objects 316) from the storage 114 to the second buffer 312 in the GPU memory 134.

In this manner, while the compute cores of the GPU 108 execute the second instance 132B of the scanner 132A/132B to process the first data stored in the first buffer 310, the buffer manager 306 causes the second buffer 312 to be filled with second data. In this manner, when the compute cores of the GPU 108 complete the scan of the first data, the compute cores of the GPU 108 can perform a subsequent scan on the second data. The GPU 108 (e.g., the buffer manager 306 and/or the compute cores) can repeat the process of alternating between scanning and filling the first buffer 310 and the second buffer 312 can be repeated until data that is to be scanned has been fully processed by the second instance 132B of the scanner 132A/132B. In some examples, the buffer manager 306 is instantiated by processor circuitry executing buffer managing instructions and/or configured to perform operations such as those represented by the flowchart of FIG. 6.

In some examples, the controller 136 includes means for managing. For example, the means for managing may be implemented by the buffer manager 306. In some examples, the buffer manager 306 may be instantiated by processor circuitry such as the example graphics processor circuitry 734 of FIG. 7. For instance, the buffer manager 306 may be instantiated by the example control circuitry 738 of FIG. 7 executing machine-executable instructions such as those implemented by at least blocks 606, 610, 612, and 616 of FIG. 6. In some examples, the buffer manager 306 may be instantiated by hardware logic circuitry, which may be implemented by an ASIC, XPU, or the FPGA circuitry 900 of FIG. 9 (e.g., the general-purpose programmable circuitry 918) structured to perform operations corresponding to the machine-readable instructions. Additionally or alternatively, the buffer manager 306 may be instantiated by any other combination of hardware, software, and/or firmware. For example, the buffer manager 306 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine-readable instructions and/or to perform some or all of the operations corresponding to the machine-readable instructions without executing software or firmware, but other structures are likewise appropriate.

Figure 4:
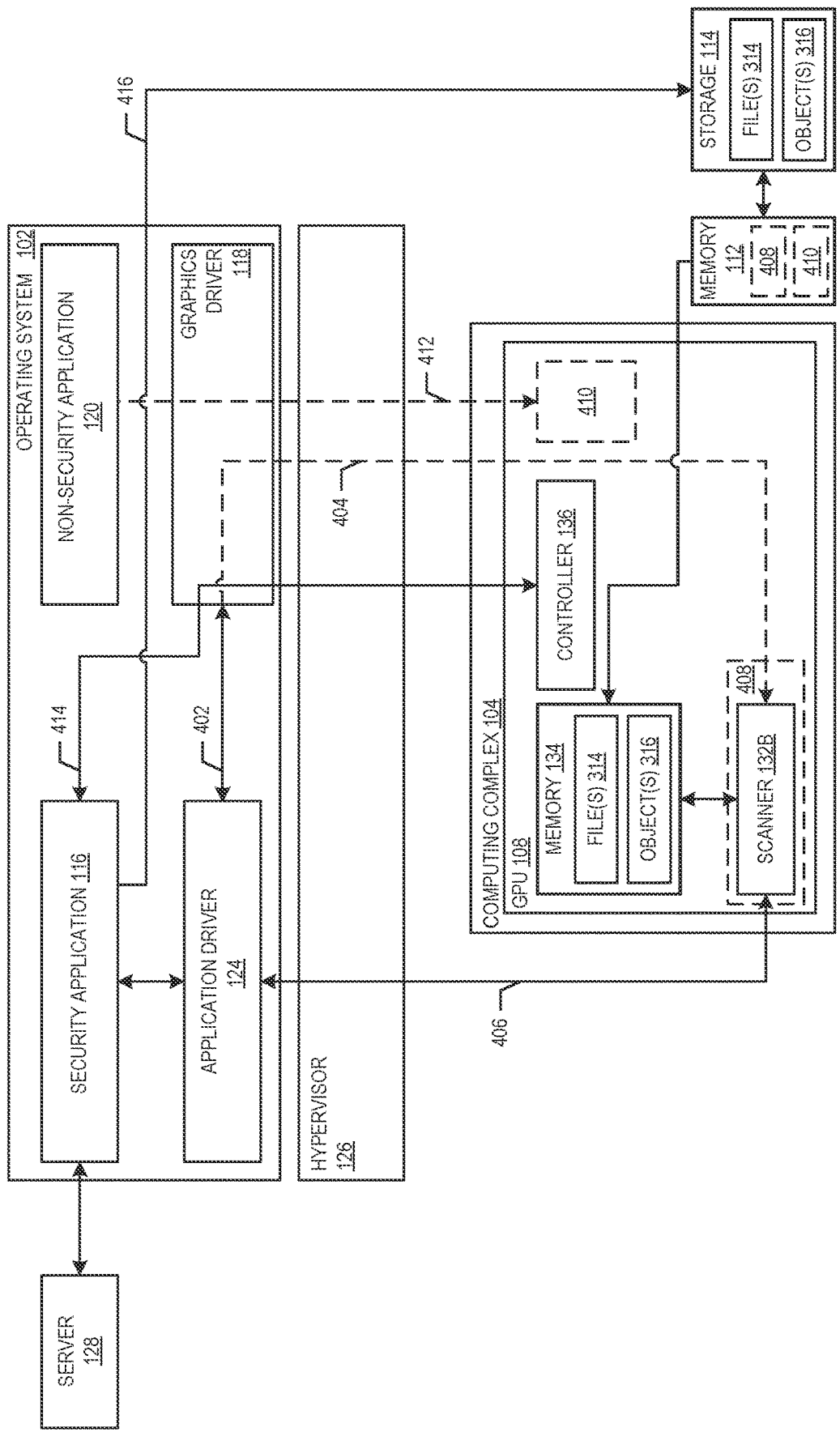
FIG. 4 illustrates example processes to offload tasks from the CPU of FIG. 1 to the GPU of FIG. 1.

FIG. 4 illustrates example processes to offload tasks from the CPU 106 of FIG. 1 to the GPU 108 of FIG. 1. In the example of FIG. 4, the graphics driver 118 controls interactions between components of the OS 102 and the GPU 108. For example, the graphics driver 118 controls interactions between the non-security application 120, which may include a display function that utilizes the GPU 108, and the GPU 108. Additionally, the example graphics driver 118 controls interactions between the example security application 116 of FIGS. 1 and/or 2 and the GPU 108. As described above, the example security application 116 offloads one or more tasks (e.g., security tasks such as scans of one or more files and/or objects) to the GPU 108 via the example graphics driver 118. While the example of FIG. 4 includes the security application 116 and the non-security application 120, any suitable number of applications can interact with the GPU 108 via the example graphics driver 118. Further, while the following describes the security application 116 and security tasks offloaded to the GPU 108 by the security application 116, any suitable type(s) of application(s) can utilize the example protections provided by the example application driver 124 and/or the example hypervisor 126 to securely offload one or more tasks to the example GPU 108.

In the illustrated example of FIG. 4, the security application 116 interacts with (e.g., communicates data to) the GPU 108 via the example application driver 124 (and the example graphics driver 118). Thus, when the example security application 116 of FIG. 1 offloads a task to the example GPU 108, the task is offloaded via communications between the example graphics driver 118 and the example application driver 124. In the example of FIG. 4, the graphics driver 118, the application driver 124, and/or the hypervisor 126 provide a secure offload process and secure execution of the offloaded task(s). In particular, an example trusted channel 402 is established between the example graphics driver 118 and the example application driver 124.

In the illustrated example of FIG. 4, with the example trusted channel 402 in place, compute tasks and/or other types of data received at the example graphics driver 118 from the application driver 124 are authenticated (e.g., verified as received from trusted source via mutual authentication procedure(s)). In the example of FIG. 4, the trusted channel 402 established between the graphics driver 118 and the example application driver 124 provides a secure tunnel 404 from the application driver 124 to the example GPU 108. As such, the trusted channel 402 established between the application driver 124 and the graphics driver 118 ensures that malicious compute task(s) are not conveyed to the otherwise vulnerable GPU 108.

In the illustrated example of FIG. 4, the hypervisor 126 of the compute platform 100 provides a privilege level protection scheme for offloading compute task(s) (e.g., scans) to the example GPU 108. In the example of FIG. 4, the hypervisor 126 supplements the protection provided by the example trusted channel 402 that provides the secure tunnel 404. In some examples, the hypervisor 126 is not implemented and the compute platform 100 relies on the trusted channel 402 to ensure the integrity of the offloading process. In some examples, the hypervisor 126 is implemented without the example trusted channel 402 being in place.

For example, in addition to or in lieu of the example secure tunnel 404 provided via the example graphics driver 118, the hypervisor 126 can monitor a communication path 406 directly mapped between the application driver 124 and the GPU 108. In some such instances, at least some of the components of the graphics driver 118 associated with the secure tunnel 404 are not utilized to communicate via the direct communication path 406. Thus, the example hypervisor 126 and the example trusted channel 402 can be used individually and/or in combination to protect the example offloaded compute task(s) such as scans of one or more files and/or objects performed by the second instance 132B of the scanner 132A/132B.

In the illustrated example of FIG. 4, the hypervisor 126 is implemented by a memory protected hypervisor. In the example of FIG. 4, the hypervisor 126 has a highest privilege level of the example compute platform 100. Having the highest privilege level enables the example hypervisor 126 to monitor, for example, an example isolated region 408 of the memory 112. In the example of FIG. 4, the hypervisor 126 creates the isolated (e.g., not visible to the OS 102) region 408 of the memory 112 and designates the isolated region 408 of the memory 112 for execution of the offloaded compute task(s) (e.g., the scanner 132A/132B). As such, the offloaded compute task(s) are isolated from other, unprivileged regions of memory to be utilized by other GPU tasks, such as image rendering.

In the illustrated example of FIG. 4, as the hypervisor 126 monitors the example isolated region 408 of the memory 112, the hypervisor 126 protects the compute platform 100 against attempted access by code having any privilege level. For example, the hypervisor 126 of FIG. 4 can detect attempted access of the isolated region 408 of the memory 112 by a program have ring-0, ring-1, ring-2, and/or ring-3 privilege level. Thus, even a program at ring-0 privilege level attempting to access the isolated region 408 of the memory 112 is detected by the example hypervisor 126, which has hypervisor privileges. As such, the example hypervisor 126 acts as a gatekeeper for the isolated region 408 of the memory 112. In some examples, when setting up the isolated region 408 of the memory 112, the hypervisor 126 configures the isolated region 408 of the memory 112 using shared virtual memory (SVM). SVM is a parallel page table structure designed for the GPU 108 to directly access the memory 112. SVM provides additional or alternative protection to the offloaded compute tasks.

Additionally, by establishing and maintaining the isolated region 408 of the memory 112, the example hypervisor 126 separates the isolated region 408 of the memory 112 from other regions of the memory 112 (e.g., example non-isolated regions 410) corresponding non-offloaded compute task(s) executed by the GPU 108. A non-offloaded compute task refers to normal use of the example GPU 108 via the graphics driver 118 by application(s) other than the example security application 116, such as a program that requests rendering of information on a display device. As described above, the example graphics driver 118 facilitates usage of the GPU 108 via the secure tunnel 404 for offloading purposes, as well as an example non-secure path 412 from the non-security application 120. Accordingly, the example hypervisor 126 isolates the isolated region 408 of the memory 112, in which the offloaded compute task(s) are performed, from non-isolated regions 410 of the memory 112, in which the non-offloaded compute tasks are performed.

In the illustrated example of FIG. 4, the security application 116 may be implemented in a secure container that provides additional or alternative protection to, for example, the security application 116. For example, the secure container may be implemented using a secure enclave. In such instances, an example secure channel 414 is established between the example secure container and the controller 136 of the GPU 108. For example, the secure channel 414 is established via key exchange and/or a mutual authentication between the secure container and the controller 136. In some examples, the secure channel 414 is further monitored by the hypervisor 126.

In the illustrated example of FIG. 4, when a task is offloaded to the GPU 108 by the security application 116, the security application 116 utilizes an example communication 416 to cause data (e.g., the one or more files 314 and/or the one or more objects 316) to be transferred from the storage 114 to the GPU memory 134. For example, the memory controller 210 of the scan manager 130 utilizes the DirectStorage API to stream data from the storage 114 to the memory 112 in a more computationally efficient manner than other techniques. As described above, in examples disclosed herein, the GPU 108 may be implemented by one or more integrated GPUs and/or one or more discrete GPUs.

In examples where the GPU 108 includes an integrated GPU, the GPU memory 134 may be implemented by a shared local memory that is shared with the CPU 106. For example, the shared local memory may be implemented by the memory 112. In such examples, the communication 416 from the memory controller 210 causes data to be transferred from the storage 114 to a dedicated portion (e.g., the isolated region 408) of the shared local memory of the GPU 108. In such examples, the isolated region 408 may be identified by an address in the shared local memory. In examples where the GPU 108 includes a discrete GPU, the GPU memory 134 may be implemented by a separate local memory distinct from the memory 112. For example, the GPU memory 134 may be a local memory on a graphics card. In such examples, the communication 416 from the memory controller 210 causes data to be transferred from the storage 114 to the local memory of the GPU 108.

While an example manner of implementing the scan manager 130 of FIG. 1 is illustrated in FIG. 2, one or more of the elements, processes, and/or devices illustrated in FIG. 2 may be combined, divided, re-arranged, omitted, eliminated, and/or implemented in any other way. Additionally, while an example manner of implementing the controller 136 of FIG. 1 is illustrated in FIG. 3, one or more of the elements, processes, and/or devices illustrated in FIG. 3 may be combined, divided, re-arranged, omitted, eliminated, and/or implemented in any other way. Further, the example OS interface 202, the example scan initiator 204, the example scan pattern selector 206, the example scan preprocessor 208, the example memory controller 210, the example partitioner 212, the example offloader 214, and/or, more generally, the example scan manager 130 of FIGS. 1 and/or 2, and/or the example host interface 302, the example decryption controller 304, the example buffer manager 306, and/or, more generally, the example controller 136 of FIGS. 1 and/or 3, and/or the scanner 132A/132B, may be implemented by hardware alone or by hardware in combination with software and/or firmware. Thus, for example, any of the example OS interface 202, the example scan initiator 204, the example scan pattern selector 206, the example scan preprocessor 208, the example memory controller 210, the example partitioner 212, the example offloader 214, and/or, more generally, the example scan manager 130 of FIGS. 1 and/or 2, and/or the example host interface 302, the example decryption controller 304, the example buffer manager 306, and/or, more generally, the example controller 136 of FIGS. 1 and/or 3, and/or the scanner 132A/132B, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example scan manager 130 of FIG. 1 may include one or more elements, processes, and/or devices in addition to, or instead of, those illustrated in FIG. 2, and/or may include more than one of any or all of the illustrated elements, processes, and devices. Additionally or alternatively, the example controller 136 of FIG. 1 may include one or more elements, processes, and/or devices in addition to, or instead of, those illustrated in FIG. 3, and/or may include more than one of any or all of the illustrated elements, processes, and devices.

Figure 5:
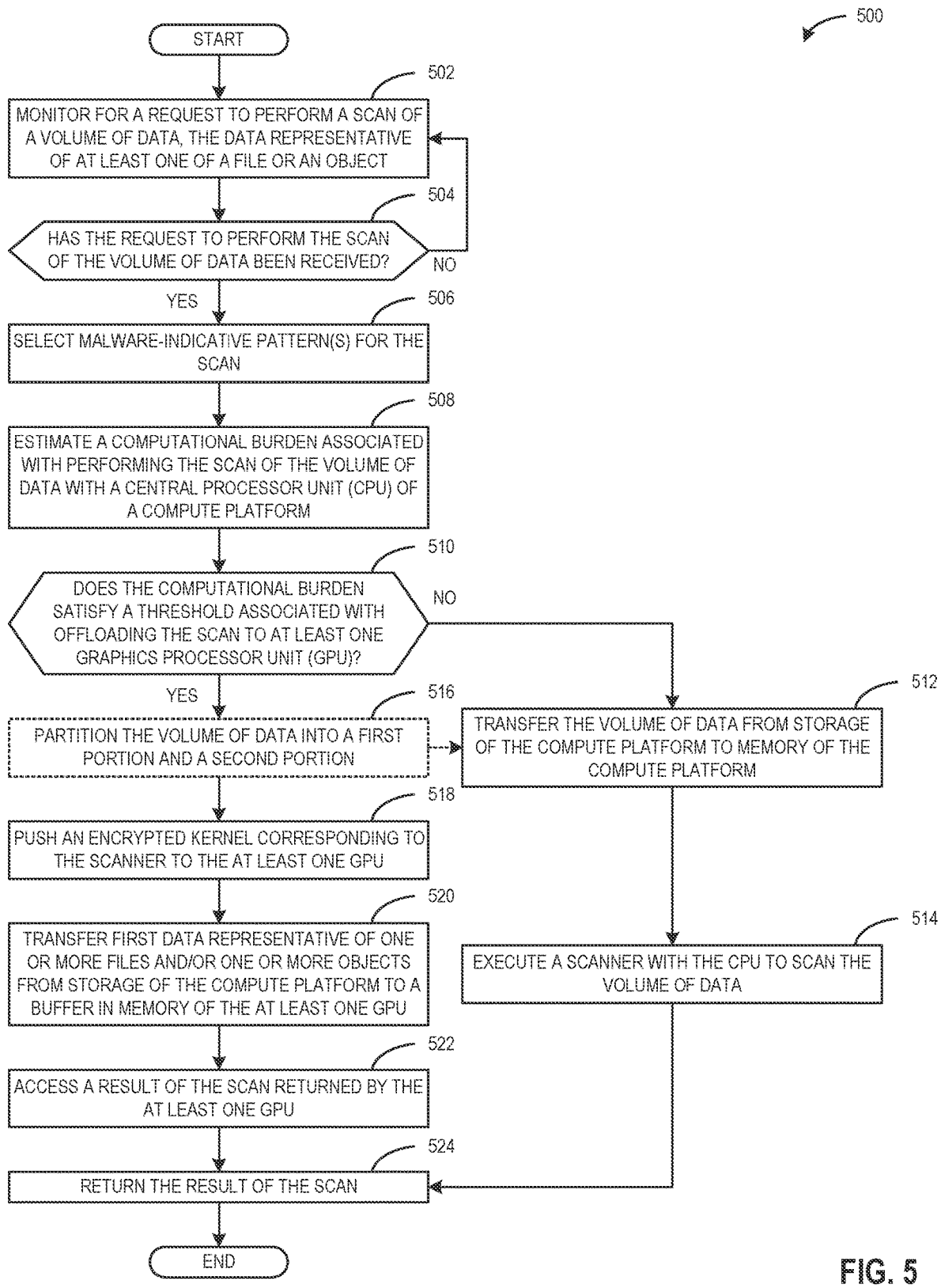
FIG. 5 is a flowchart representative of example machine-readable instructions and/or example operations that may be executed and/or instantiated by example processor circuitry to implement the scan manager of FIGS. 1 and/or 2 and/or the scanner of FIG. 1.
Figure 6:
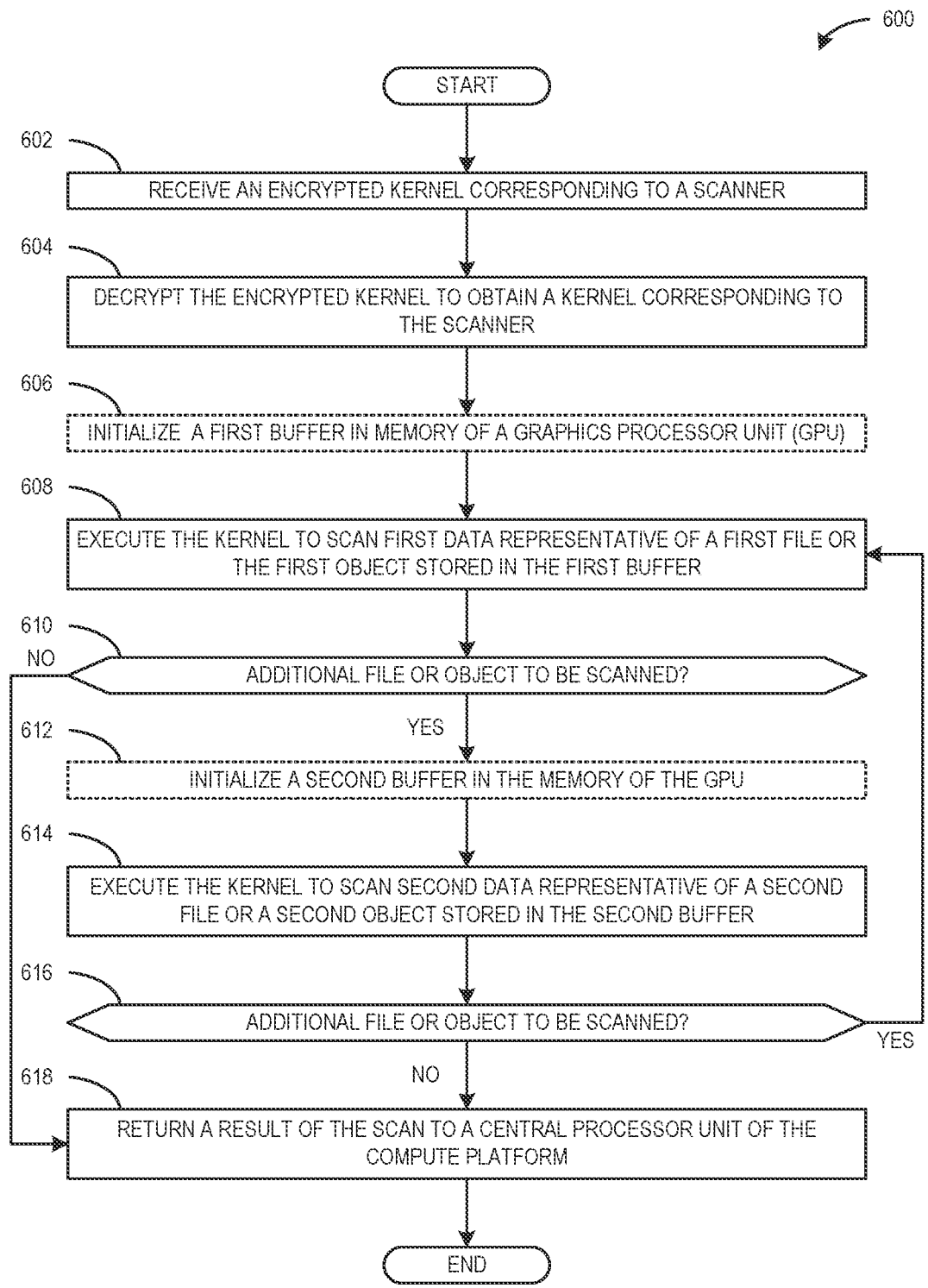
FIG. 6 is a flowchart representative of example machine-readable instructions and/or example operations that may be executed and/or instantiated by example processor circuitry to implement the controller of FIGS. 1 and/or 3 and/or the scanner of FIG. 1.

A flowchart representative of example machine-readable instructions, which may be executed to configure processor circuitry (e.g., the instructions cause processor circuitry) to implement the scan manager 130 of FIGS. 1 and/or 2 and/or the scanner 132A/132B of FIG. 1, is shown in FIG. 5. Additionally, a flowchart representative of example machine-readable instructions, which may be executed to configure processor circuitry to implement the controller 136 of FIGS. 1 and/or 3 and/or the scanner 132A/132B of FIG. 1, is shown in FIG. 6. The machine-readable instructions may be one or more executable programs or portion(s) of an executable program for execution by processor circuitry, such as the processor circuitry 712 and/or the graphics processor circuitry 734 shown in the example processor platform 700 discussed below in connection with FIG. 7 and/or the example processor circuitry discussed below in connection with FIGS. 8 and/or 9. The program may be embodied in software stored on one or more non-transitory computer-readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine-readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer-readable storage media may include one or more mediums located in one or more hardware devices. Further, although the example program is described with reference to the flowcharts illustrated in FIGS. 5 and 6, many other methods of implementing the example scan manager 130 and/or the example controller 136 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU, an XPU, etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine-readable instructions described herein may be stored in one or more of a compressed format, an encrypted format, a fragmented format, a compiled format, an executable format, a packaged format, etc. Machine-readable instructions as described herein may be stored as data or a data structure (e.g., as portions of instructions, code, representations of code, etc.) that may be utilized to create, manufacture, and/or produce machine-executable instructions. For example, the machine-readable instructions may be fragmented and stored on one or more storage devices and/or computing devices (e.g., servers) located at the same or different locations of a network or collection of networks (e.g., in the cloud, in edge devices, etc.). The machine-readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine-readable instructions may be stored in multiple parts, which are individually compressed, encrypted, and/or stored on separate computing devices, wherein the parts when decrypted, decompressed, and/or combined form a set of machine-executable instructions that implement one or more operations that may together form a program such as that described herein.

In another example, the machine-readable instructions may be stored in a state in which they may be read by processor circuitry, but require addition of a library (e.g., a dynamic link library (DLL)), a software development kit (SDK), an application programming interface (API), etc., in order to execute the machine-readable instructions on a particular computing device or other device. In another example, the machine-readable instructions may need to be configured (e.g., settings stored, data input, network addresses recorded, etc.) before the machine-readable instructions and/or the corresponding program(s) can be executed in whole or in part. Thus, machine-readable media, as used herein, may include machine-readable instructions and/or program(s) regardless of the particular format or state of the machine-readable instructions and/or program(s) when stored or otherwise at rest or in transit.

The machine-readable instructions described herein can be represented by any past, present, or future instruction language, scripting language, programming language, etc. For example, the machine-readable instructions may be represented using any of the following languages: C, C++, Java, C #, Perl, Python, JavaScript, HyperText Markup Language (HTML), Structured Query Language (SQL), Swift, etc.

As mentioned above, the example operations of FIGS. 5 and/or 6 may be implemented using executable instructions (e.g., computer and/or machine-readable instructions) stored on one or more non-transitory computer and/or machine-readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer-readable medium, non-transitory computer-readable storage medium, non-transitory machine-readable medium, and non-transitory machine-readable storage medium are expressly defined to include any type of computer-readable storage device and/or storage disk and to exclude propagating signals and to exclude transmission media. As used herein, the terms "computer-readable storage device" and "machine-readable storage device" are defined to include any physical (mechanical and/or electrical) structure to store information, but to exclude propagating signals and to exclude transmission media. Examples of computer-readable storage devices and machine-readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer-readable instructions, machine-readable instructions, etc., and/or manufactured to execute computer-readable instructions, machine-readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 5 is a flowchart representative of example machine-readable instructions and/or example operations 500 that may be executed and/or instantiated by example processor circuitry to implement the scan manager 130 of FIGS. 1 and/or 2 and/or the scanner 132A/132B of FIG. 1. The machine-readable instructions and/or the operations 500 of FIG. 5 begin at block 502, at which the OS interface 202 monitors for a request to perform a scan of a volume of data. For example, the OS interface 202 monitors the security application 116. In the example of FIG. 5, the volume of data is representative of at least one of a file or an object.

In the illustrated example of FIG. 5, at block 504, the scan initiator 204 determines whether the request to perform the scan of the volume of data has been received. In some examples, the scan initiator 204 determines whether a threshold amount of data to be scanned has been received with the requests. Based on (e.g., in response to) the scan initiator 204 determining that the request to perform the scan of the volume of data has not been received (block 504: NO), the machine-readable instructions and/or the operations 500 return to block 502. Based on (e.g., in response to) the scan initiator 204 determining that the request to perform the scan of the volume of data has been received (block 504: YES), the machine-readable instructions and/or the operations 500 proceed to block 506.

In the illustrated example of FIG. 5, at block 506, the scan pattern selector 206 selects one or more malware-indicative patterns for the scan. At block 508, the scan preprocessor 208 estimates a computational burden associated with performing the scan of the volume of data with the CPU 106 of the compute platform 100. For example, the scan preprocessor 208 estimates the computational burden based on the number and size of the files and/or objects represented in the data. In some examples, the scan preprocessor 208 estimates the computational burden based on hardware capabilities of the CPU 106. Additional or alternative parameters can be used by the scan preprocessor 208 to estimate the computational burden as disclosed herein. In some examples, the parameters used by the scan preprocessor 208 to estimate the computational burden can be customized by a developer of the scan manager 130.

In the illustrated example of FIG. 5, at block 510, the scan preprocessor 208 determines whether the computational burden satisfies a threshold associated with offloading the scan to at least one GPU (e.g., the GPU 108). In the example of FIG. 5, the threshold is a predefined value based on the computational burden that would be expended to offload the scan to the GPU 108. In additional or alternative examples, the threshold can be a variable value that the scan preprocessor 208 computes during runtime based on the based on a number of files and/or objects represented in the volume of data, the size of the one or more files and/or objects, and/or types of the one or more files and/or objects.

In the illustrated example of FIG. 5, based on (e.g., in response to) the scan preprocessor 208 determining that the computational burden does not satisfy the threshold associated with offloading the scan to at least one GPU (block 510: NO), the machine-readable instructions and/or the operations 500 proceed to block 512. At block 512, the memory controller 210 transfers the volume of data from the storage 114 of the compute platform 100 to the memory 112 of the compute platform 100. At block 514, the CPU 106 executes the first instance 132A of the scanner 132A/132B to scan the volume of data.

Returning to block 510, based on (e.g., in response to) the scan preprocessor 208 determining that the computational burden satisfies the threshold associated with offloading the scan to at least one GPU (block 510: YES), the machine-readable instructions and/or the operations 500 proceed to block 516. At block 516, the partitioner 212 partitions the volume of data into a first portion and a second portion. For example, as described above, the partitioner 212 determines whether to partition the volume of data based on the estimation of the computational burden of performing the scan with the CPU 106, the extent to which the computational burden satisfies (e.g., exceeds) the threshold associated with offloading the scan to the GPU 108, a current computational burden of the CPU 106, and/or a current computational burden of the GPU 108. After partitioning the volume of data into two or more portions, the partitioner 212 provides respective portions to the CPU 106 and the GPU 108.

In some examples, the machine-readable instructions and/or the operations 500 omit block 516 and proceed to block 518. For example, when the partitioner 212 and/or the offloader 214 determine that the computational efficiency of performing the scan would be improved by performing the scan exclusively on the GPU 108, block 516 may be omitted. In such examples, based on (e.g., in response to) the scan preprocessor 208 determining that the computational burden satisfies the threshold associated with offloading the scan to at least one GPU (block 510: YES), the machine-readable instructions and/or the operations 500 proceed to block 518 and skip block 516.

As described above, in the case the scan preprocessor 208 determines that the estimated computational burden of performing the scan with the CPU 106 satisfies (e.g., exceeds) the threshold associated with offloading the scan to the GPU 108, then, at block 518, the offloader 214 pushes an encrypted kernel corresponding to the scanner 132A/132B (e.g., an encrypted pattern matching engine) to the at least one GPU (e.g., the GPU 108). In some examples, as described above, the first instance 132A of the scanner 132A/132B is executed by the CPU 106 and the second instance 132B of the scanner 132A/132B is executed by the GPU 108 to process (e.g., scan) two or more partitions of data in parallel.

In the illustrated example of FIG. 5, at block 520, the memory controller 210 transfers first data representative of one or more files and/or one or more objects from the storage 114 of the compute platform 100 to a buffer in memory of the at least one GPU. As described above, the memory controller 210 utilizes the DirectStorage API to stream data from the storage 114 to the first buffer 310 in the GPU memory 134. In the example of FIG. 5, the memory controller 210 may coordinate with the buffer manager 306 to cyclically load multiple buffers in the GPU memory 134 such that when the compute cores of the GPU 108 complete a scan of first data in a first buffer of the GPU memory 134, the compute cores of the GPU 108 can perform a subsequent scan on second data in a second buffer of the GPU memory 134. In the example of FIG. 5, at block 522, the offloader 214 accesses a result of the scan returned by the at least one GPU (e.g., the GPU 108).

In the illustrated example of FIG. 5, at block 524, the OS interface 202 returns the result of the scan. For example, the OS interface 202 provides the result of the scan to a user interface of the security application 116. Subsequently, the machine-readable instructions and/or the operations 500 terminate. The machine-readable instructions and/or the operations 500 may be re-executed and/or re-instantiated as needed, for example, upon request from the security application 116, in response to a trigger event, and/or at a predefined time, as described above.

FIG. 6 is a flowchart representative of example machine-readable instructions and/or example operations 600 that may be executed and/or instantiated by example processor circuitry to implement the controller 136 of FIGS. 1 and/or 3 and/or the scanner 132A/132B of FIG. 1. The machine-readable instructions and/or the operations 600 of FIG. 6 begin at block 602, at which the host interface 302 receives an encrypted kernel corresponding to the scanner 132A/132B. At block 604, the decryption controller 304 decrypts (e.g., unencrypts) the encrypted kernel within GPU memory (e.g., the GPU memory 134) to obtain a kernel corresponding to the scanner 132A/132B. Subsequently, the controller 136 initializes the scanner 132A/132B on one or more compute cores of the GPU 108.

As described above, within the GPU memory (e.g., the GPU memory 134), the buffer manager 306 initializes two buffers to improve the performance of the scan by the GPU 108. For example, at block 606, the buffer manager 306 initializes a first buffer (e.g., the first buffer 310) of memory of the GPU 108 (e.g., the GPU memory 134). Subsequently, the memory controller 210 transfers first data representative of a first file or a first object from storage of the compute platform 100 to the first buffer in the memory of the GPU 108. For example, the memory controller 210 utilizes the DirectStorage API to stream the first data from the storage 114 to the first buffer 310 in the GPU memory 134. Once the first buffer is full, the GPU 108 executes the kernel (e.g., the second instance 132B of the scanner 132A/132B) at block 608 to scan the first data representative of the first file or the first object.

In the illustrated example of FIG. 6, at block 610, the buffer manager 306 determines whether there is an additional file or object to be scanned. Based on (e.g., in response to) the buffer manager 306 determining that there is not an additional file or object to be scanned (block 610: NO), the machine-readable instructions and/or the operations 600 proceed to block 618. Based on (e.g., in response to) the buffer manager 306 determining that there is an additional file or object to be scanned (block 610: YES), the machine-readable instructions and/or the operations 600 proceed to block 612.

In the illustrated example of FIG. 6, at block 612, the buffer manager 306 initializes a second buffer (e.g., the second buffer 312) of memory of the GPU 108 (e.g., the GPU memory 134). Subsequently, the memory controller 210 transfers second data representative of a second file or a second object from storage of the compute platform 100 to the second buffer in the memory of the GPU 108. For example, the memory controller 210 utilizes the DirectStorage API to stream the second data from the storage 114 to the second buffer 312 in the GPU memory 134. In the example of FIG. 6, while the GPU 108 executes the second instance 132B of the scanner 132A/132B to scan the first data in the first buffer 310, the buffer manager 306 initializes the second buffer 312 and the memory controller 210 loads the second data into the second buffer 312.

In the illustrated example of FIG. 6, at block 614, the GPU 108 executes the kernel (e.g., the second instance 132B of the scanner 132A/132B) to scan the second data representative of the second file or the second object. For example, once the second buffer is full and the GPU 108 has fully scanned the first data in the first buffer, the GPU 108 executes the kernel (e.g., the second instance 132B of the scanner 132A/132B) to scan the second data representative of the second file or the second object. At block 616, the buffer manager 306 determines whether there is an additional file or object to be scanned. For example, the process of loading one buffer while the GPU 108 scans data in another buffer (e.g., blocks 606-616) can be repeated until the queue of files and/or objects to be scanned is empty. In some examples, the machine-readable instructions and/or the operations 600 omit blocks 606 and 612 and proceed to blocks 608 and 614, respectively. For example, when processing an additional file or object, blocks 606 and 612 can be omitted because the first buffer 310 and the second buffer 312 have already been initialized.

In the illustrated example of FIG. 6, based on (e.g., in response to) the buffer manager 306 determining that there is an additional file or object to be scanned (block 616: YES), the machine-readable instructions and/or the operations 600 return to block 608. Based on (e.g., in response to) the buffer manager 306 determining that there is not an additional file or object to be scanned (block 616: NO), the machine-readable instructions and/or the operations 600 proceed to block 618. At block 618, the host interface 302 returns a result of the scan to the CPU 106 of the compute platform 100. Subsequently, the machine-readable instructions and/or the operations 600 terminate. The machine-readable instructions and/or the operations 600 may be re-executed and/or re-instantiated as needed, for example, upon request from the security application 116, in response to a trigger event, and/or at a predefined time, as described above.

Additionally, as described above, the CPU 106 and the GPU 108 can execute the scanner 132A/132B in parallel based on, for example, energy management purposes (e.g., to free up resources for CPU-oriented tasks such as documents creation, web browsing, or general Operating System tasks). As such, in some examples, the CPU 106 executes the machine-readable instructions and/or the operations 500 while the GPU 108 executes machine-readable instructions and/or the operations 600. Accordingly, examples disclosed herein improve computational efficiency of performing scans of files and/or objects while also improving user experience (e.g., by freeing up the CPU 106 for CPU-oriented tasks).

Figure 7:
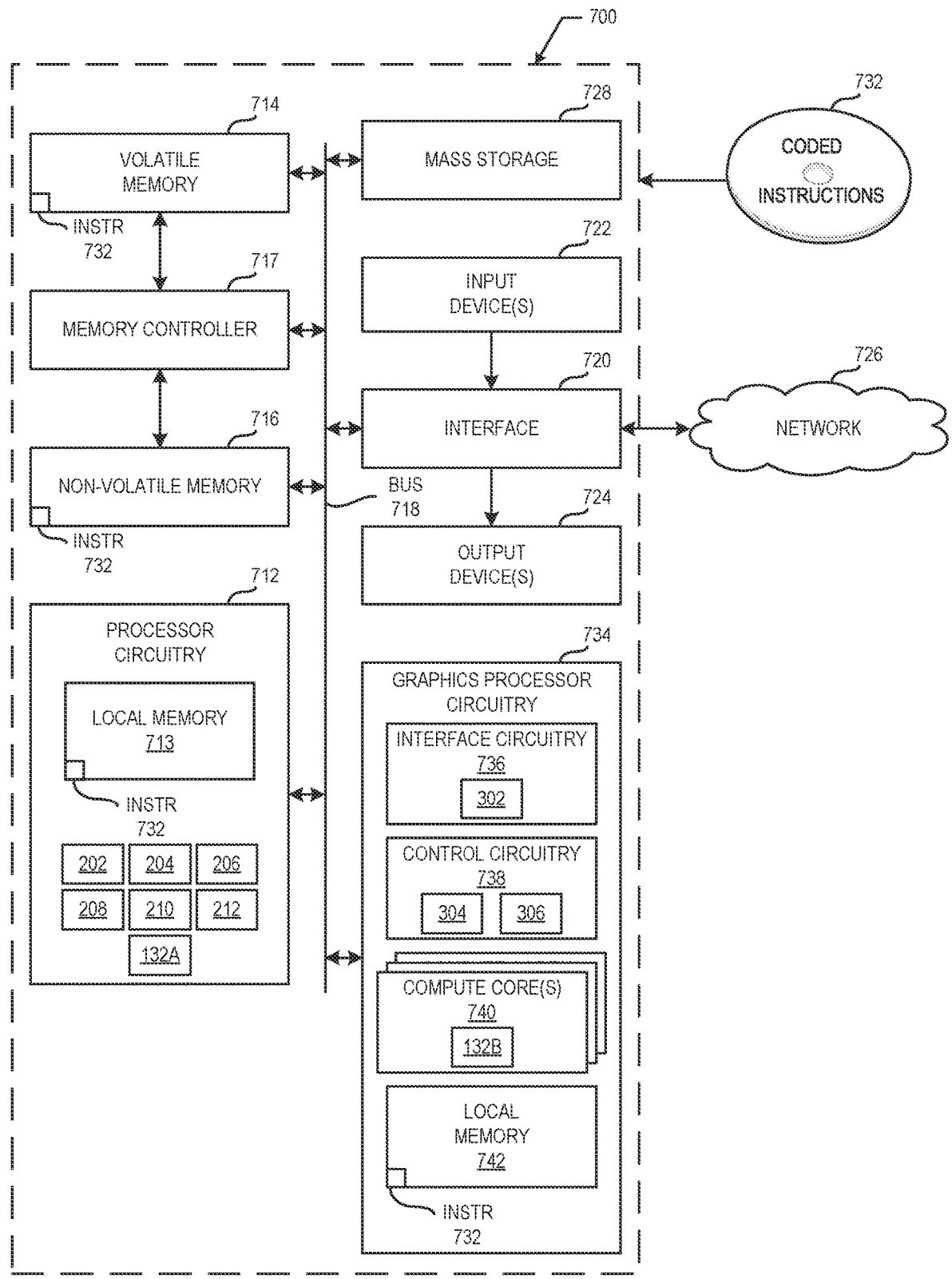
FIG. 7 is a block diagram of an example processing platform including processor circuitry structured to execute the example machine-readable instructions and/or the example operations of FIG. 5 to implement the scan manager of FIGS. 1 and/or 2 and/or the example machine-readable instructions and/or the example operations of FIG. 6 to implement the controller of FIGS. 1 and/or 3.

FIG. 7 is a block diagram of an example processor platform 700 structured to execute and/or instantiate the machine-readable instructions and/or the operations 500 of FIG. 5 to implement the scan manager 130 of FIGS. 1 and/or 2 and/or the scanner 132A/132B and/or the machine-readable instructions and/or the operations 600 of FIG. 6 to implement the controller 136 of FIGS. 1 and/or 3 and/or the scanner 132A/132B. The processor platform 700 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 700 of the illustrated example includes processor circuitry 712. The processor circuitry 712 of the illustrated example is hardware. For example, the processor circuitry 712 can be implemented by one or more integrated circuits, logic circuits, FPGAs, microprocessors, CPUs, GPUs, DSPs, and/or microcontrollers from any desired family or manufacturer. The processor circuitry 712 may be implemented by one or more semiconductor based (e.g., silicon based) devices. In this example, the processor circuitry 712 implements the example OS interface 202, the example scan initiator 204, the example scan pattern selector 206, the example scan preprocessor 208, the example memory controller 210, the example partitioner 212, the example offloader 214, and/or the first instance 132A of the scanner 132A/132B.

The processor circuitry 712 of the illustrated example includes a local memory 713 (e.g., a cache, registers, etc.). The processor circuitry 712 of the illustrated example is in communication with a main memory including a volatile memory 714 and a non-volatile memory 716 by a bus 718. The volatile memory 714 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 716 may be implemented by flash memory and/or any other desired type of memory device. Access to the main memory 714, 716 of the illustrated example is controlled by a memory controller 717.

The processor platform 700 of the illustrated example also includes interface circuitry 720. The interface circuitry 720 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 722 are connected to the interface circuitry 720. The input device(s) 722 permit(s) a user to enter data and/or commands into the processor circuitry 712. The input device(s) 722 can be implemented by, for example, an audio sensor, a microphone, a camera (still or video), a keyboard, a button, a mouse, a touchscreen, a trackpad, a trackball, an isopoint device, and/or a voice recognition system.

One or more output devices 724 are also connected to the interface circuitry 720 of the illustrated example. The output device(s) 724 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 720 of the illustrated example, thus, typically includes a graphics driver card, a graphics driver chip, and/or graphics processor circuitry such as a GPU.

The interface circuitry 720 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 726. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 700 of the illustrated example also includes one or more mass storage devices 728 to store software and/or data. Examples of such mass storage devices 728 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine-readable instructions 732, which may be implemented by the machine-readable instructions and/or operations 500 of FIG. 5 and/or the machine-readable instructions and/or operations 600 of FIG. 6, may be stored in the mass storage device 728, in the volatile memory 714, in the non-volatile memory 716, and/or on a removable non-transitory computer-readable storage medium such as a CD or DVD.

The processor platform 700 of the illustrated example additionally includes example graphics processor circuitry 734. The example graphics processor circuitry includes example interface circuitry 736, example control circuitry 738, one or more example compute cores 740, and example local memory 742. The interface circuitry 736 of the illustrated example may be implemented by hardware in accordance with any type of interface standard, such as an Ethernet interface, a USB interface, a Bluetooth® interface, a NFC interface, a PCI interface, and/or a PCIe (or PCIE) interface. In the example of FIG. 7, the interface circuitry 736 is in communication with the processor circuitry 712. In this example, the interface circuitry 736 implements the example host interface 302.

In the example of FIG. 7, the control circuitry 738 includes semiconductor-based circuits structured to control (e.g., coordinate) data movement within the graphics processor circuitry 734. In this example, the control circuitry 738 implements the example decryption controller 304 and the example buffer manager 306. Additionally, in the example of FIG. 7, the one or more compute cores 740 includes arithmetic and logic (AL) circuitry, a plurality of registers, and memory. Other structures may be present, such as a bus. For example, the one or more compute cores 740 may include vector unit circuitry, single instruction multiple data (SIMD) unit circuitry, load/store unit (LSU) circuitry, branch/jump unit circuitry, floating-point unit (FPU) circuitry, etc. The example AL circuitry includes semiconductor-based circuits structured to perform one or more mathematic and/or logic operations on the data within the one or more compute cores 740. In this example, the one or more compute cores 740 implement the second instance 132B of the scanner 132A/132B.

In the example of FIG. 7, the local memory 742 may be implemented by local memory, one or more share local memories, VRAM, among others. In this example, the local memory 742 stores the machine-readable instructions 732. As described above, the machine-readable instructions 732 may be implemented by the machine-readable instructions and/or operations 500 of FIG. 5 and/or the machine-readable instructions and/or operations 600 of FIG. 6.

Figure 8:
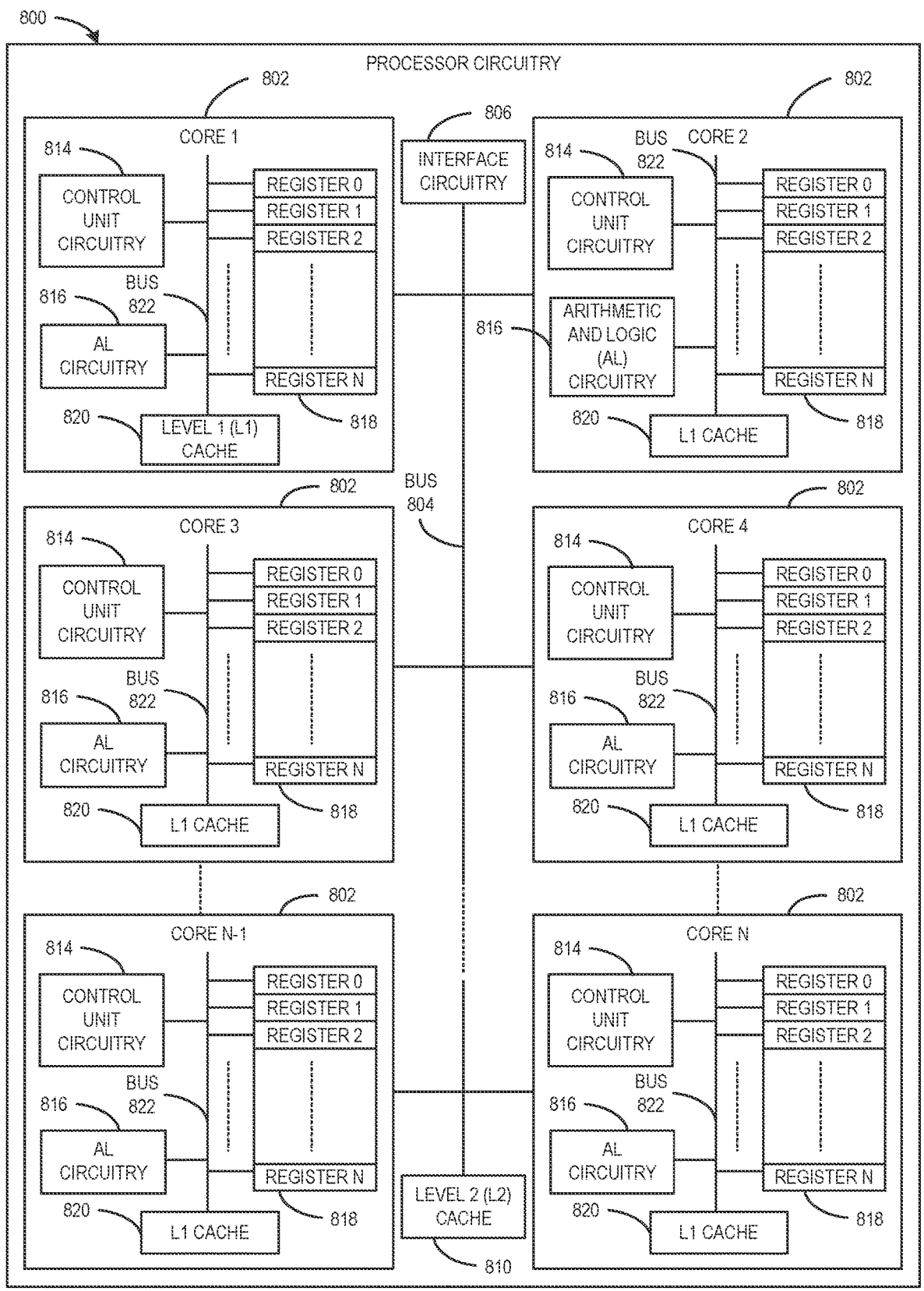
FIG. 8 is a block diagram of an example implementation of the processor circuitry of FIG. 7.

FIG. 8 is a block diagram of an example implementation of the processor circuitry 712 of FIG. 7. In this example, the processor circuitry 712 of FIG. 7 is implemented by a microprocessor 800. For example, the microprocessor 800 may be a general-purpose microprocessor (e.g., general-purpose microprocessor circuitry). The microprocessor 800 executes some or all of the machine-readable instructions of the flowcharts of FIGS. 5 and/or 6 to effectively instantiate the circuitry of FIGS. 2 and/or 3 as logic circuits to perform the operations corresponding to those machine-readable instructions. In some such examples, the circuitry of FIGS. 2 and/or 3 is instantiated by the hardware circuits of the microprocessor 800 in combination with the instructions. For example, the microprocessor 800 may be implemented by multi-core hardware circuitry such as a CPU, a DSP, a GPU, an XPU, etc. Although it may include any number of example cores 802 (e.g., 1 core), the microprocessor 800 of this example is a multi-core semiconductor device including N cores. The cores 802 of the microprocessor 800 may operate independently or may cooperate to execute machine-readable instructions. For example, machine code corresponding to a firmware program, an embedded software program, or a software program may be executed by one of the cores 802 or may be executed by multiple ones of the cores 802 at the same or different times. In some examples, the machine code corresponding to the firmware program, the embedded software program, or the software program is split into threads and executed in parallel by two or more of the cores 802. The software program may correspond to a portion or all of the machine-readable instructions and/or operations represented by the flowcharts of FIGS. 5 and/or 6.

The cores 802 may communicate by a first example bus 804. In some examples, the first bus 804 may be implemented by a communication bus to effectuate communication associated with one(s) of the cores 802. For example, the first bus 804 may be implemented by at least one of an Inter-Integrated Circuit (I2C) bus, a Serial Peripheral Interface (SPI) bus, a PCI bus, or a PCIe bus. Additionally or alternatively, the first bus 804 may be implemented by any other type of computing or electrical bus. The cores 802 may obtain data, instructions, and/or signals from one or more external devices by example interface circuitry 806. The cores 802 may output data, instructions, and/or signals to the one or more external devices by the interface circuitry 806. Although the cores 802 of this example include example local memory 820 (e.g., Level 1 (L1) cache that may be split into an L1 data cache and an L1 instruction cache), the microprocessor 800 also includes example shared memory 810 that may be shared by the cores (e.g., Level 2 (L2 cache)) for high-speed access to data and/or instructions. Data and/or instructions may be transferred (e.g., shared) by writing to and/or reading from the shared memory 810. The local memory 820 of each of the cores 802 and the shared memory 810 may be part of a hierarchy of storage devices including multiple levels of cache memory and the main memory (e.g., the main memory 714, 716 of FIG. 7). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 802 may be referred to as a CPU, DSP, GPU, etc., or any other type of hardware circuitry. Each core 802 includes control unit circuitry 814, arithmetic and logic (AL) circuitry 816 (sometimes referred to as an ALU), a plurality of registers 818, the local memory 820, and a second example bus 822. Other structures may be present. For example, each core 802 may include vector unit circuitry, single instruction multiple data (SIMD) unit circuitry, load/store unit (LSU) circuitry, branch/jump unit circuitry, floating-point unit (FPU) circuitry, etc. The control unit circuitry 814 includes semiconductor-based circuits structured to control (e.g., coordinate) data movement within the corresponding core 802. The AL circuitry 816 includes semiconductor-based circuits structured to perform one or more mathematic and/or logic operations on the data within the corresponding core 802. The AL circuitry 816 of some examples performs integer-based operations. In other examples, the AL circuitry 816 also performs floating point operations. In yet other examples, the AL circuitry 816 may include first AL circuitry that performs integer-based operations and second AL circuitry that performs floating point operations. In some examples, the AL circuitry 816 may be referred to as an Arithmetic Logic Unit (ALU). The registers 818 are semiconductor-based structures to store data and/or instructions such as results of one or more of the operations performed by the AL circuitry 816 of the corresponding core 802. For example, the registers 818 may include vector register(s), SIMD register(s), general-purpose register(s), flag register(s), segment register(s), machine specific register(s), instruction pointer register(s), control register(s), debug register(s), memory management register(s), machine check register(s), etc. The registers 818 may be arranged in a bank as shown in FIG. 8. Alternatively, the registers 818 may be organized in any other arrangement, format, or structure including distributed throughout the core 802 to shorten access time. The second bus 822 may be implemented by at least one of an I2C bus, a SPI bus, a PCI bus, or a PCIe bus.

Each core 802 and/or, more generally, the microprocessor 800 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 800 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general-purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 9:
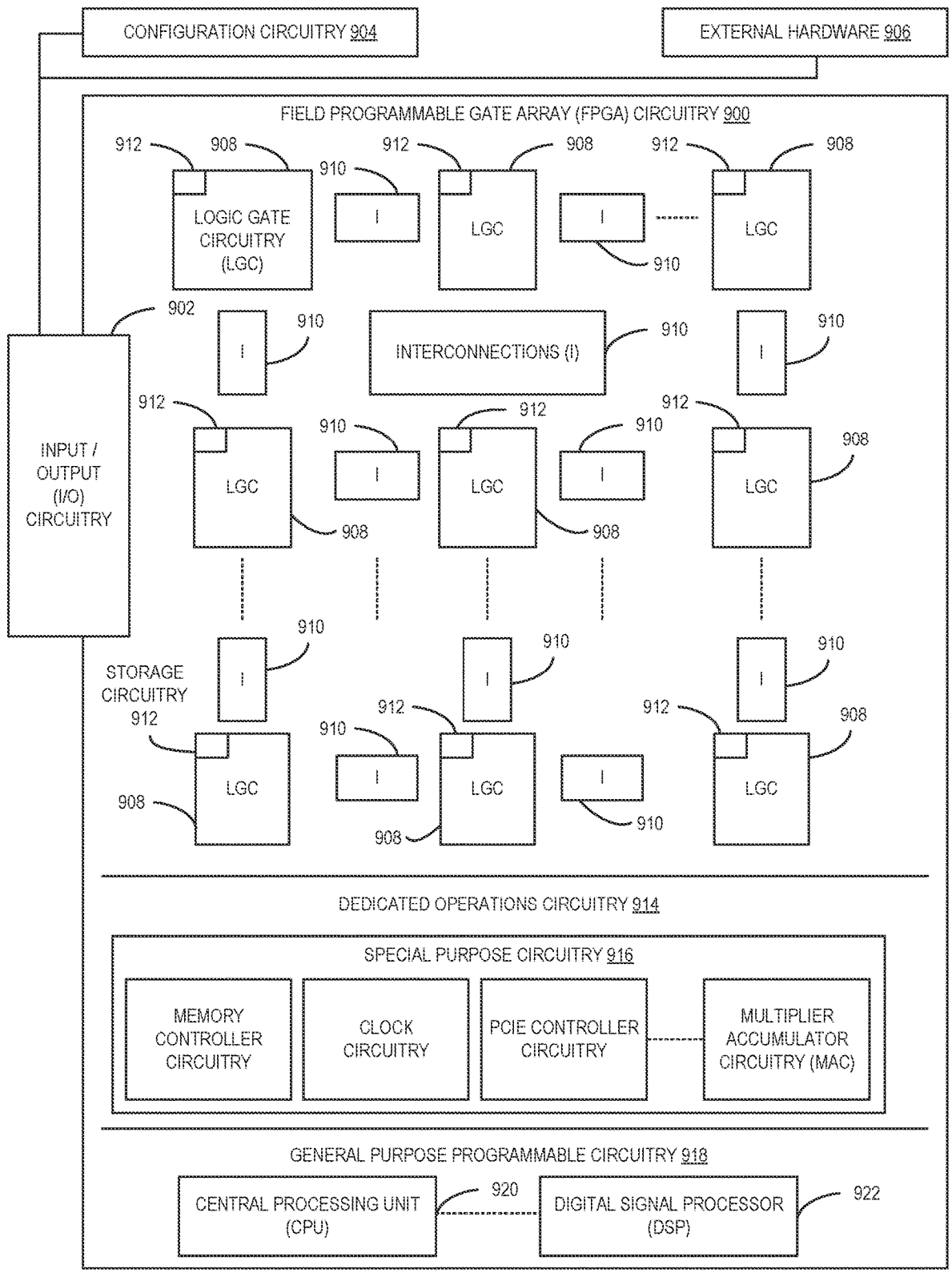
FIG. 9 is a block diagram of another example implementation of the processor circuitry of FIG. 7.

FIG. 9 is a block diagram of another example implementation of the processor circuitry 712 of FIG. 7. In this example, the processor circuitry 712 is implemented by FPGA circuitry 900. For example, the FPGA circuitry 900 may be implemented by an FPGA. The FPGA circuitry 900 can be used, for example, to perform operations that could otherwise be performed by the example microprocessor 800 of FIG. 8 executing corresponding machine-readable instructions. However, once configured, the FPGA circuitry 900 instantiates the machine-readable instructions in hardware and, thus, can often execute the operations faster than they could be performed by a general-purpose microprocessor executing the corresponding software.

More specifically, in contrast to the microprocessor 800 of FIG. 8 described above (which is a general-purpose device that may be programmed to execute some or all of the machine-readable instructions represented by the flowcharts of FIGS. 5 and/or 6 but whose interconnections and logic circuitry are fixed once fabricated), the FPGA circuitry 900 of the example of FIG. 9 includes interconnections and logic circuitry that may be configured and/or interconnected in different ways after fabrication to instantiate, for example, some or all of the machine-readable instructions represented by the flowcharts of FIGS. 5 and/or 6. In particular, the FPGA circuitry 900 may be thought of as an array of logic gates, interconnections, and switches. The switches can be programmed to change how the logic gates are interconnected by the interconnections, effectively forming one or more dedicated logic circuits (unless and until the FPGA circuitry 900 is reprogrammed). The configured logic circuits enable the logic gates to cooperate in different ways to perform different operations on data received by input circuitry. Those operations may correspond to some or all of the software represented by the flowcharts of FIGS. 5 and/or 6. As such, the FPGA circuitry 900 may be structured to effectively instantiate some or all of the machine-readable instructions of the flowcharts of FIGS. 5 and/or 6 as dedicated logic circuits to perform the operations corresponding to those software instructions in a dedicated manner analogous to an ASIC. Therefore, the FPGA circuitry 900 may perform the operations corresponding to some or all of the machine-readable instructions of FIGS. 5 and/or 6 faster than the general-purpose microprocessor can execute the same.

In the example of FIG. 9, the FPGA circuitry 900 is structured to be programmed (and/or reprogrammed one or more times) by an end user by a hardware description language (HDL) such as Verilog. The FPGA circuitry 900 of FIG. 9, includes example input/output (I/O) circuitry 902 to obtain and/or output data to/from example configuration circuitry 904 and/or external hardware 906. For example, the configuration circuitry 904 may be implemented by interface circuitry that may obtain machine-readable instructions to configure the FPGA circuitry 900, or portion(s) thereof. In some such examples, the configuration circuitry 904 may obtain the machine-readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 906 may be implemented by external hardware circuitry. For example, the external hardware 906 may be implemented by the microprocessor 800 of FIG. 8. The FPGA circuitry 900 also includes an array of example logic gate circuitry 908, a plurality of example configurable interconnections 910, and example storage circuitry 912. The logic gate circuitry 908 and the configurable interconnections 910 are configurable to instantiate one or more operations that may correspond to at least some of the machine-readable instructions of FIGS. 5 and/or 6 and/or other desired operations. The logic gate circuitry 908 shown in FIG. 9 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 908 to enable configuration of the electrical structures and/or the logic gates to form circuits to perform desired operations. The logic gate circuitry 908 may include other electrical structures such as look-up tables (LUTs), registers (e.g., flip-flops or latches), multiplexers, etc.

The configurable interconnections 910 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 908 to program desired logic circuits.

The storage circuitry 912 of the illustrated example is structured to store result(s) of the one or more of the operations performed by corresponding logic gates. The storage circuitry 912 may be implemented by registers or the like. In the illustrated example, the storage circuitry 912 is distributed amongst the logic gate circuitry 908 to facilitate access and increase execution speed.

The example FPGA circuitry 900 of FIG. 9 also includes example Dedicated Operations Circuitry 914. In this example, the Dedicated Operations Circuitry 914 includes special-purpose circuitry 916 that may be invoked to implement commonly used functions to avoid the need to program those functions in the field. Examples of such special-purpose circuitry 916 include memory (e.g., DRAM) controller circuitry, PCIe controller circuitry, clock circuitry, transceiver circuitry, memory, and multiplier-accumulator circuitry. Other types of special-purpose circuitry may be present. In some examples, the FPGA circuitry 900 may also include example general-purpose programmable circuitry 918 such as an example CPU 920 and/or an example DSP 922. Other general-purpose programmable circuitry 918 may additionally or alternatively be present such as a GPU, an XPU, etc., that can be programmed to perform other operations.

Although FIGS. 8 and 9 illustrate two example implementations of the processor circuitry 712 of FIG. 7, many other approaches are contemplated. For example, as mentioned above, modern FPGA circuitry may include an on-board CPU, such as one or more of the example CPU 920 of FIG. 9. Therefore, the processor circuitry 712 of FIG. 7 may additionally be implemented by combining the example microprocessor 800 of FIG. 8 and the example FPGA circuitry 900 of FIG. 9. In some such hybrid examples, a first portion of the machine-readable instructions represented by the flowcharts of FIGS. 5 and/or 6 may be executed by one or more of the cores 802 of FIG. 8, a second portion of the machine-readable instructions represented by the flowcharts of FIGS. 5 and/or 6 may be executed by the FPGA circuitry 900 of FIG. 9, and/or a third portion of the machine-readable instructions represented by the flowcharts of FIGS. 5 and/or 6 may be executed by an ASIC. It should be understood that some or all of the circuitry of FIGS. 2 and/or 3 may, thus, be instantiated at the same or different times. Some or all of the circuitry may be instantiated, for example, in one or more threads executing concurrently and/or in series. Moreover, in some examples, some or all of the circuitry of FIGS. 2 and/or 3 may be implemented within one or more virtual machines and/or containers executing on the microprocessor.

In some examples, the processor circuitry 712 of FIG. 7 may be in one or more packages. For example, the microprocessor 800 of FIG. 8 and/or the FPGA circuitry 900 of FIG. 9 may be in one or more packages. In some examples, an XPU may be implemented by the processor circuitry 712 of FIG. 7, which may be in one or more packages. For example, the XPU may include a CPU in one package, a DSP in another package, a GPU in yet another package, and an FPGA in still yet another package.

Figure 10:
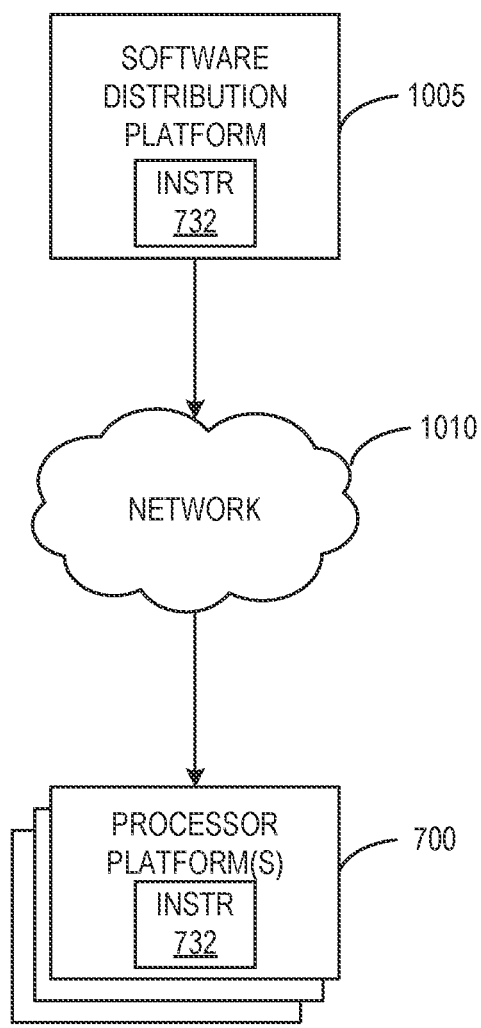
FIG. 10 is a block diagram of an example software distribution platform (e.g., one or more servers) to distribute software (e.g., software corresponding to the example machine-readable instructions of FIGS. 5 and/or 6) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1005 to distribute software such as the example machine-readable instructions 732 of FIG. 7 to hardware devices owned and/or operated by third parties is illustrated in FIG. 10. The example software distribution platform 1005 may be implemented by any computer server, data facility, cloud service, etc., capable of storing and transmitting software to other computing devices. The third parties may be customers of the entity owning and/or operating the software distribution platform 1005. For example, the entity that owns and/or operates the software distribution platform 1005 may be a developer, a seller, and/or a licensor of software such as the example machine-readable instructions 732 of FIG. 7. The third parties may be consumers, users, retailers, OEMs, etc., who purchase and/or license the software for use and/or re-sale and/or sub-licensing. In the illustrated example, the software distribution platform 1005 includes one or more servers and one or more storage devices. The storage devices store the machine-readable instructions 732, which may correspond to the example machine-readable instructions and/or the example operations 500 of FIG. 5 and/or the example machine-readable instructions and/or the example operations 600 of FIG. 6, as described above. The one or more servers of the example software distribution platform 1005 are in communication with an example network 1010, which may correspond to any one or more of the Internet and/or any of the example networks described above. In some examples, the one or more servers are responsive to requests to transmit the software to a requesting party as part of a commercial transaction. Payment for the delivery, sale, and/or license of the software may be handled by the one or more servers of the software distribution platform and/or by a third-party payment entity. The servers enable purchasers and/or licensors to download the machine-readable instructions 732 from the software distribution platform 1005. For example, the software, which may correspond to the example machine-readable instructions and/or the example operations 500 of FIG. 5 and/or the example machine-readable instructions and/or the example operations 600 of FIG. 6, may be downloaded to the example processor platform 700, which is to execute the machine-readable instructions 732 to implement the example scan manager 130 of FIGS. 1 and/or 2, the example controller 136 of FIGS. 1 and/or 3, and/or the example scanner 132A/132B. In some examples, one or more servers of the software distribution platform 1005 periodically offer, transmit, and/or force updates to the software (e.g., the example machine-readable instructions 732 of FIG. 7) to ensure improvements, patches, updates, etc., are distributed and applied to the software at the end user devices.

From the foregoing, it will be appreciated that example systems, methods, apparatus, and articles of manufacture have been disclosed that improve offloading of malware scans. Example systems, methods, apparatus, and articles of manufacture disclosed herein leverage technology (e.g., DirectStorage) to achieve high-speed data transfers from NVMe® storage to GPU memory. Disclosed examples also utilize technology (e.g., DirectCompute) to perform the scanning operations on the data in a GPU-optimized manner. Disclosed systems, methods, apparatus, and articles of manufacture improve the efficiency of using a computing device by combining DirectStorage, which permits high-throughput transfer of data from NVMe® storage to GPU memory, with DirectCompute, which permits high-throughput scanning of the data in GPU memory, for the purpose of activating a GPU-backed offloading strategy when scanning using pattern matching. Additionally, as described above, disclosed examples can be executed in parallel on the CPU and GPU of a compute platform which allows for improved security of the compute platform. Disclosed systems, methods, apparatus, and articles of manufacture are accordingly directed to one or more improvement(s) in the operation of a machine such as a computer or other electronic and/or mechanical device.

Example methods, apparatus, systems, and articles of manufacture to improve offloading of malware scans are disclosed herein. Further examples and combinations thereof include the following:

Example 1 includes an apparatus comprising a graphics processor unit (GPU), machine-readable instructions, and a central processor unit (CPU) to at least one of instantiate or execute the machine-readable instructions to based on a trigger to perform a scan of a volume of data, estimate a computational burden associated with performing the scan using the CPU, the volume of data representative of at least one of a file or an object, determine whether the computational burden satisfies a threshold associated with offloading the scan to the GPU, and cause at least one of the CPU or the GPU to perform the scan based on whether the computational burden satisfies the threshold.

Example 2 includes the apparatus of example 1, wherein based on the computational burden not satisfying the threshold, the CPU is to execute a malware scanner to perform the scan of the volume of data.

Example 3 includes the apparatus of example 1, wherein based on the computational burden satisfying the threshold, the CPU is to provide a kernel corresponding to a malware scanner to the GPU to cause the GPU to perform the scan of the volume of data.

Example 4 includes the apparatus of example 1, wherein the CPU is to estimate the computational burden based on at least one of (1) a number of files or objects represented by the volume of data, (2) respective sizes of the files or the objects, (3) respective types of the files or the objects, (4) a current computational burden on the CPU, (5) a current computational burden on the GPU, or (6) a hardware capability of a compute platform including the CPU and the GPU.

Example 5 includes the apparatus of example 1, wherein based on the computational burden satisfying the threshold, the CPU is to partition the volume of data into a first portion and a second portion, provide a kernel corresponding to a malware scanner to the GPU to cause the GPU to scan the first portion of the volume of data, and execute the malware scanner to scan the second portion of the volume of data.

Example 6 includes the apparatus of example 5, wherein the first portion of the volume of data is larger than the second portion of the volume of data, and the CPU is to provide the kernel to the GPU to cause the GPU to scan the first portion of the volume of data based on a determination that the GPU will scan the first portion of the volume of data more efficiently than the CPU.

Example 7 includes the apparatus of example 1, wherein the GPU is an integrated GPU, the apparatus further includes a discrete GPU, and the CPU is to, based on the computational burden satisfying the threshold, provide a kernel corresponding to a malware scanner to at least one of the integrated GPU or the discrete GPU based on at least one of a current computational burden on the integrated GPU or a current computational burden on the discrete GPU.

Example 8 includes a non-transitory machine-readable storage medium comprising instructions that, when executed, cause a central processor unit (CPU) to at least based on a trigger to perform a scan of a volume of data, estimate a computational burden associated with performing the scan using the CPU, the volume of data representative of at least one of a file or an object, determine whether the computational burden satisfies a threshold associated with offloading the scan to a graphics processor unit (GPU), and cause at least one of the CPU or the GPU to perform the scan based on whether the computational burden satisfies the threshold.

Example 9 includes the non-transitory machine-readable storage medium of example 8, wherein the instructions cause the CPU to, based on the computational burden not satisfying the threshold, perform the scan of the volume of data.

Example 10 includes the non-transitory machine-readable storage medium of example 8, wherein the instructions cause the CPU to, based on the computational burden satisfying the threshold, provide a kernel corresponding to a malware scanner to the GPU to cause the GPU to perform the scan of the volume of data.

Example 11 includes the non-transitory machine-readable storage medium of example 8, wherein the instructions cause the CPU to estimate the computational burden based on at least one of (1) a number of files or objects represented by the volume of data, (2) respective sizes of the files or the objects, (3) respective types of the files or the objects, (4) a current computational burden on the CPU, (5) a current computational burden on the GPU, or (6) a hardware capability of a compute platform including the CPU and the GPU.

Example 12 includes the non-transitory machine-readable storage medium of example 8, wherein the instructions cause the CPU to, based on the computational burden satisfying the threshold partition the volume of data into a first portion and a second portion, provide a kernel corresponding to a malware scanner to the GPU to cause the GPU to scan the first portion of the volume of data, and execute the malware scanner to scan the second portion of the volume of data.

Example 13 includes the non-transitory machine-readable storage medium of example 12, wherein the first portion of the volume of data is larger than the second portion of the volume of data, and the instructions cause the CPU to provide the kernel to the GPU to cause the GPU to scan the first portion of the volume of data based on a determination that the GPU will scan the first portion of the volume of data more efficiently than the CPU.

Example 14 includes the non-transitory machine-readable storage medium of example 8, wherein the GPU is an integrated GPU, and the instructions cause the CPU to, based on the computational burden satisfying the threshold, provide a kernel corresponding to a malware scanner to at least one of the integrated GPU or a discrete GPU based on at least one of a current computational burden on the integrated GPU or a current computational burden on the discrete GPU.

Example 15 includes a method comprising based on a trigger to perform a scan of a volume of data, estimating, by executing an instruction with a central processor unit (CPU), a computational burden associated with performing the scan using the CPU, the volume of data representative of at least one of a file or an object, determining, by executing an instruction with the CPU, whether the computational burden satisfies a threshold associated with offloading the scan to a graphics processor unit (GPU), and causing, by executing an instruction with the CPU, at least one of the CPU or the GPU to perform the scan based on whether the computational burden satisfies the threshold.

Example 16 includes the method of example 15, further including, based on the computational burden not satisfying the threshold, executing a malware scanner with the CPU to perform the scan of the volume of data.

Example 17 includes the method of example 15, further including, based on the computational burden satisfying the threshold, providing a kernel corresponding to a malware scanner to the GPU to cause the GPU to perform the scan of the volume of data.

Example 18 includes the method of example 15, further including estimating the computational burden based on at least one of (1) a number of files or objects represented by the volume of data, (2) respective sizes of the files or the objects, (3) respective types of the files or the objects, (4) a current computational burden on the CPU, (5) a current computational burden on the GPU, or (6) a hardware capability of a compute platform including the CPU and the GPU.

Example 19 includes the method of example 15, further including, based on the computational burden satisfying the threshold partitioning the volume of data into a first portion and a second portion, providing a kernel corresponding to a malware scanner to the GPU to cause the GPU to scan the first portion of the volume of data, and executing the malware scanner with the CPU to scan the second portion of the volume of data.

Example 20 includes the method of example 19, wherein the first portion of the volume of data is larger than the second portion of the volume of data, and the method further includes providing the kernel to the GPU to cause the GPU to scan the first portion of the volume of data based on determining that the GPU will scan the first portion of the volume of data more efficiently than the CPU.

Example 21 includes the method of example 15, wherein the GPU is an integrated GPU, and the method further includes, based on the computational burden satisfying the threshold, providing a kernel corresponding to a malware scanner to at least one of the integrated GPU or a discrete GPU based on at least one of a current computational burden on the integrated GPU or a current computational burden on the discrete GPU.

Example 22 includes an apparatus comprising means for preprocessing a scan of a volume of data to based on a trigger to perform the scan, estimate a computational burden associated with performing the scan using a central processor unit (CPU), the volume of data representative of at least one of a file or an object, and determine whether the computational burden satisfies a threshold associated with offloading the scan to a graphics processor unit (GPU), and at least one of means for performing or means for offloading to cause at least one of the CPU or the GPU to perform the scan, respectively, based on whether the computational burden satisfies the threshold.

Example 23 includes the apparatus of example 22, wherein the means for performing is to, based on the computational burden not satisfying the threshold, execute a malware scanner with the CPU to perform the scan of the volume of data.

Example 24 includes the apparatus of example 22, wherein the means for offloading is to, based on the computational burden satisfying the threshold, provide a kernel corresponding to a malware scanner to the GPU to cause the GPU to perform the scan of the volume of data.

Example 25 includes the apparatus of example 22, wherein the means for preprocessing is to estimate the computational burden based on at least one of (1) a number of files or objects represented by the volume of data, (2) respective sizes of the files or the objects, (3) respective types of the files or the objects, (4) a current computational burden on the CPU, (5) a current computational burden on the GPU, or (6) a hardware capability of a compute platform including the CPU and the GPU.

Example 26 includes the apparatus of example 22, wherein the apparatus further includes means for partitioning the volume of data into a first portion and a second portion based on the computational burden satisfying the threshold, the means for offloading is to provide a kernel corresponding to a malware scanner to the GPU to cause the GPU to scan the first portion of the volume of data, and the means for performing is to execute the malware scanner with the CPU to scan the second portion of the volume of data.

Example 27 includes the apparatus of example 26, wherein the first portion of the volume of data is larger than the second portion of the volume of data, and the means for offloading is to provide the kernel to the GPU to cause the GPU to scan the first portion of the volume of data based on a determination that the GPU will scan the first portion of the volume of data more efficiently than the CPU.

Example 28 includes the apparatus of example 22, wherein the GPU is an integrated GPU, and the means for offloading is to, based on the computational burden satisfying the threshold, provide a kernel corresponding to a malware scanner to at least one of the integrated GPU or a discrete GPU based on at least one of a current computational burden on the integrated GPU or a current computational burden on the discrete GPU.

Example 29 includes an apparatus to comprising interface circuitry, machine-readable instructions, and processor circuitry to at least one of instantiate or execute the machine-readable instructions to based on a trigger to perform a scan of a volume of data, estimate a computational burden associated with performing the scan using a central processor unit (CPU), the volume of data representative of at least one of a file or an object, determine whether the computational burden satisfies a threshold associated with offloading the scan to a graphics processor unit (GPU), and cause at least one of the CPU or the GPU to perform the scan based on whether the computational burden satisfies the threshold.

Example 30 includes the apparatus of example 29, wherein based on the computational burden not satisfying the threshold, the processor circuitry is to cause the CPU to execute a malware scanner to perform the scan of the volume of data.

Example 31 includes the apparatus of example 29, wherein based on the computational burden satisfying the threshold, the processor circuitry is to provide a kernel corresponding to a malware scanner to the GPU to cause the GPU to perform the scan of the volume of data.

Example 32 includes the apparatus of example 29, wherein the processor circuitry is to estimate the computational burden based on at least one of (1) a number of files or objects represented by the volume of data, (2) respective sizes of the files or the objects, (3) respective types of the files or the objects, (4) a current computational burden on the CPU, (5) a current computational burden on the GPU, or (6) a hardware capability of a compute platform including the CPU and the GPU.

Example 33 includes the apparatus of example 29, wherein based on the computational burden satisfying the threshold, the processor circuitry is to partition the volume of data into a first portion and a second portion, provide a kernel corresponding to a malware scanner to the GPU to cause the GPU to scan the first portion of the volume of data, and cause the CPU to execute the malware scanner to scan the second portion of the volume of data.

Example 34 includes the apparatus of example 33, wherein the first portion of the volume of data is larger than the second portion of the volume of data, and the processor circuitry is to provide the kernel to the GPU to cause the GPU to scan the first portion of the volume of data based on a determination that the GPU will scan the first portion of the volume of data more efficiently than the CPU.

Example 35 includes the apparatus of example 29, wherein the GPU is an integrated GPU, and the processor circuitry is to, based on the computational burden satisfying the threshold, provide a kernel corresponding to a malware scanner to at least one of the integrated GPU or a discrete GPU based on at least one of a current computational burden on the integrated GPU or a current computational burden on the discrete GPU.

Example 36 includes a graphics processor unit (GPU) comprising interface circuitry to access a kernel corresponding to a malware scanner, machine-readable instructions, control circuitry to at least one of instantiate or execute the machine-readable instructions to initialize a first buffer in memory of the GPU, and during a first scan of first data stored in the first buffer, initialize a second buffer in the memory, and one or more compute cores to at least one of instantiate or execute the kernel to perform the first scan of the first data with the malware scanner, and perform a second scan of second data stored in the second buffer with the malware scanner.

Example 37 includes the GPU of example 36, wherein the kernel is to be developed in accordance with DirectCompute application programming interface (API).

Example 38 includes the GPU of example 37, wherein the first buffer is to be populated with the first data via DirectStorage API.

Example 39 includes the GPU of example 38, wherein to perform at least one of the first scan or the second scan, the one or more compute cores is to perform pattern matching on at least one of the first data or the second data.

Example 40 includes the GPU of example 36, wherein the kernel is an encrypted kernel, the interface circuitry is to access the encrypted kernel from a central processor unit of a compute platform, and the control circuitry is to decrypt the encrypted kernel in the memory to obtain an unencrypted kernel.

Example 41 includes the GPU of example 36, wherein the interface circuitry is to return at least one result of at least one of the first scan or the second scan to a central processor unit of a compute platform.

Example 42 includes the GPU of example 36, wherein the second buffer is to be populated with the second data while the one or more compute cores is to perform the first scan of the first data so that when the one or more compute cores completes the first scan, the one or more compute cores can perform the second scan on the second data.

Example 43 includes the GPU of example 36, wherein to perform at least one of the first scan or the second scan, the one or more compute cores is to perform pattern matching on at least one of the first data or the second data.

Example 44 includes a non-transitory machine-readable storage medium comprising instructions that, when executed, cause a graphics processor unit (GPU) to at least initialize a first buffer in memory of the GPU, perform a first scan of first data stored in the first buffer with a malware scanner corresponding to a kernel, during the first scan, initialize a second buffer in the memory, and perform a second scan of second data stored in the second buffer with the malware scanner.

Example 45 includes the non-transitory machine-readable storage medium of example 44, wherein the kernel is to be developed in accordance with DirectCompute application programming interface (API).

Example 46 includes the non-transitory machine-readable storage medium of example 45, wherein the first buffer is to be populated with the first data via DirectStorage API.

Example 47 includes the non-transitory machine-readable storage medium of example 46, wherein to perform at least one of the first scan or the second scan, the instructions cause the GPU to perform pattern matching on at least one of the first data or the second data.

Example 48 includes the non-transitory machine-readable storage medium of example 44, wherein the kernel is an encrypted kernel, and the instructions cause the GPU to access the encrypted kernel from a central processor unit of a compute platform, and decrypt the encrypted kernel in the memory to obtain an unencrypted kernel.

Example 49 includes the non-transitory machine-readable storage medium of example 44, wherein the instructions cause the GPU to return at least one result of at least one of the first scan or the second scan to a central processor unit of a compute platform.

Example 50 includes the non-transitory machine-readable storage medium of example 44, wherein the second buffer is to be populated with the second data during performance of the first scan of the first data so that when the first scan is complete, the GPU can perform the second scan on the second data.

Example 51 includes the non-transitory machine-readable storage medium of example 44, wherein to perform at least one of the first scan or the second scan, the instructions cause the GPU to perform pattern matching on at least one of the first data or the second data.

Example 52 includes a method comprising accessing a kernel corresponding to a malware scanner, initializing, by executing an instruction with a graphics processor circuitry (GPU), a first buffer in memory of the GPU, performing, by executing the kernel with the GPU, a first scan of first data stored in the first buffer with the malware scanner, during the first scan, initializing, by executing an instruction with the GPU, a second buffer in the memory, and performing, by executing the kernel with the GPU, a second scan of second data stored in the second buffer with the malware scanner.

Example 53 includes the method of example 52, wherein the kernel is to be developed in accordance with Direct-Compute application programming interface (API).

Example 54 includes the method of example 53, wherein the first buffer is to be populated with the first data via DirectStorage API.

Example 55 includes the method of example 54, wherein performing at least one of the first scan or the second scan includes performing pattern matching on at least one of the first data or the second data.

Example 56 includes the method of example 52, wherein the kernel is an encrypted kernel, and the method further includes accessing the encrypted kernel from a central processor unit of a compute platform, and decrypting the encrypted kernel in the memory to obtain an unencrypted kernel.

Example 57 includes the method of example 52, further including returning at least one result of at least one of the first scan or the second scan to a central processor unit of a compute platform.

Example 58 includes the method of example 52, wherein the second buffer is to be populated with the second data during performance of the first scan of the first data so that when the first scan is complete, the GPU can perform the second scan on the second data.

Example 59 includes the method of example 52, wherein performing at least one of the first scan or the second scan includes performing pattern matching on at least one of the first data or the second data.

Example 60 includes a graphics processor unit (GPU) comprising means for interfacing with a central processor unit (CPU) of a compute platform to access a kernel corresponding to a malware scanner, means for managing at least one buffer to initialize a first buffer in memory of the GPU, and during a first scan of first data stored in the first buffer, initialize a second buffer in the memory, and means for scanning to perform the first scan of the first data with the malware scanner, and perform a second scan of second data stored in the second buffer with the malware scanner.

Example 61 includes the GPU of example 60, wherein the kernel is to be developed in accordance with DirectCompute application programming interface (API).

Example 62 includes the GPU of example 61, wherein the first buffer is to be populated with the first data via DirectStorage API.

Example 63 includes the GPU of example 62, wherein to perform at least one of the first scan or the second scan, the means for scanning is to perform pattern matching on at least one of the first data or the second data.

Example 64 includes the GPU of example 60, wherein the kernel is an encrypted kernel, and the means for interfacing with the CPU of the compute platform is to access the encrypted kernel, and the GPU further includes means for decrypting the encrypted kernel in the memory to obtain an unencrypted kernel.

Example 65 includes the GPU of example 60, wherein the means for interfacing with the CPU of the compute platform is to return at least one result of at least one of the first scan or the second scan to the CPU.

Example 66 includes the GPU of example 60, wherein the second buffer is to be populated with the second data while the means for scanning is to perform the first scan of the first data so that when the means for scanning completes the first scan, the means for scanning can perform the second scan on the second data.

Example 67 includes the GPU of example 60, wherein to perform at least one of the first scan or the second scan, the means for scanning is to perform pattern matching on at least one of the first data or the second data.

Example 68 includes an apparatus comprising interface circuitry to access a kernel corresponding to a malware scanner, machine-readable instructions, and processor circuitry to at least one of instantiate or execute the machine-readable instructions to initialize a first buffer in memory of a graphics processor unit (GPU), perform a first scan of first data stored in the first buffer with the malware scanner, during the first scan, initialize a second buffer in the memory, and perform a second scan of second data stored in the second buffer with the malware scanner.

Example 69 includes the apparatus of example 68, wherein the kernel is to be developed in accordance with DirectCompute application programming interface (API).

Example 70 includes the apparatus of example 69, wherein the first buffer is to be populated with the first data via DirectStorage API.

Example 71 includes the apparatus of example 70, wherein to perform at least one of the first scan or the second scan, the processor circuitry is to perform pattern matching on at least one of the first data or the second data.

Example 72 includes the apparatus of example 68, wherein the kernel is an encrypted kernel, the interface circuitry is to access the encrypted kernel from a central processor unit of a compute platform, and the processor circuitry is to decrypt the encrypted kernel in the memory to obtain an unencrypted kernel.

Example 73 includes the apparatus of example 68, wherein the interface circuitry is to return at least one result of at least one of the first scan or the second scan to a central processor unit of a compute platform.

Example 74 includes the apparatus of example 68, wherein the second buffer is to be populated with the second data while the processor circuitry is to perform the first scan of the first data so that when the processor circuitry completes the first scan, the processor circuitry can perform the second scan on the second data.

Example 75 includes the apparatus of example 68, wherein to perform at least one of the first scan or the second scan, the processor circuitry is to perform pattern matching on at least one of the first data or the second data.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus comprising:
a graphics processor unit (GPU);
machine-readable instructions; and
a central processor unit (CPU) to at least one of instantiate or execute the machine-readable instructions to:
based on a trigger to perform a scan of a volume of data, estimate a computational burden associated with performing the scan using the CPU, the volume of data representative of at least one of a file or an object;
determine whether the computational burden satisfies a threshold associated with offloading the scan to the GPU; and
cause at least one of the CPU or the GPU to perform the scan based on whether the computational burden satisfies the threshold.

2. The apparatus of claim 1, wherein based on the computational burden not satisfying the threshold, the CPU is to execute a malware scanner to perform the scan of the volume of data.

3. The apparatus of claim 1, wherein based on the computational burden satisfying the threshold, the CPU is to provide a kernel corresponding to a malware scanner to the GPU to cause the GPU to perform the scan of the volume of data.

4. The apparatus of claim 1, wherein the CPU is to estimate the computational burden based on at least one of (1) a number of files or objects represented by the volume of data, (2) respective sizes of the files or the objects, (3) respective types of the files or the objects, (4) a current computational burden on the CPU, (5) a current computational burden on the GPU, or (6) a hardware capability of a compute platform including the CPU and the GPU.

5. The apparatus of claim 1, wherein based on the computational burden satisfying the threshold, the CPU is to:
partition the volume of data into a first portion and a second portion;
provide a kernel corresponding to a malware scanner to the GPU to cause the GPU to scan the first portion of the volume of data; and
execute the malware scanner to scan the second portion of the volume of data.

6. The apparatus of claim 5, wherein the first portion of the volume of data is larger than the second portion of the volume of data, and the CPU is to provide the kernel to the GPU to cause the GPU to scan the first portion of the volume of data based on a determination that the GPU will scan the first portion of the volume of data more efficiently than the CPU.

7. The apparatus of claim 1, wherein the GPU is an integrated GPU, the apparatus further includes a discrete GPU, and the CPU is to, based on the computational burden satisfying the threshold, provide a kernel corresponding to a malware scanner to at least one of the integrated GPU or the discrete GPU based on at least one of a current computational burden on the integrated GPU or a current computational burden on the discrete GPU.

8. A non-transitory machine-readable storage medium comprising instructions that, when executed, cause a central processor unit (CPU) to at least:
based on a trigger to perform a scan of a volume of data, estimate a computational burden associated with performing the scan using the CPU, the volume of data representative of at least one of a file or an object;
determine whether the computational burden satisfies a threshold associated with offloading the scan to a graphics processor unit (GPU); and
cause at least one of the CPU or the GPU to perform the scan based on whether the computational burden satisfies the threshold.

9. The non-transitory machine-readable storage medium of claim 8, wherein the instructions cause the CPU to, based on the computational burden not satisfying the threshold, perform the scan of the volume of data.

10. The non-transitory machine-readable storage medium of claim 8, wherein the instructions cause the CPU to, based on the computational burden satisfying the threshold, provide a kernel corresponding to a malware scanner to the GPU to cause the GPU to perform the scan of the volume of data.

11. The non-transitory machine-readable storage medium of claim 8, wherein the instructions cause the CPU to estimate the computational burden based on at least one of (1) a number of files or objects represented by the volume of data, (2) respective sizes of the files or the objects, (3) respective types of the files or the objects, (4) a current computational burden on the CPU, (5) a current computational burden on the GPU, or (6) a hardware capability of a compute platform including the CPU and the GPU.

12. The non-transitory machine-readable storage medium of claim 8, wherein the instructions cause the CPU to, based on the computational burden satisfying the threshold:
partition the volume of data into a first portion and a second portion;
provide a kernel corresponding to a malware scanner to the GPU to cause the GPU to scan the first portion of the volume of data; and
execute the malware scanner to scan the second portion of the volume of data.

13. The non-transitory machine-readable storage medium of claim 12, wherein the first portion of the volume of data is larger than the second portion of the volume of data, and the instructions cause the CPU to provide the kernel to the GPU to cause the GPU to scan the first portion of the volume of data based on a determination that the GPU will scan the first portion of the volume of data more efficiently than the CPU.

14. The non-transitory machine-readable storage medium of claim 8, wherein the GPU is an integrated GPU, and the instructions cause the CPU to, based on the computational burden satisfying the threshold, provide a kernel corresponding to a malware scanner to at least one of the integrated GPU or a discrete GPU based on at least one of a current computational burden on the integrated GPU or a current computational burden on the discrete GPU.

15. A method comprising:
based on a trigger to perform a scan of a volume of data, estimating, by executing an instruction with a central processor unit (CPU), a computational burden associated with performing the scan using the CPU, the volume of data representative of at least one of a file or an object;

determining, by executing an instruction with the CPU, whether the computational burden satisfies a threshold associated with offloading the scan to a graphics processor unit (GPU); and causing, by executing an instruction with the CPU, at least one of the CPU or the GPU to perform the scan based on whether the computational burden satisfies the threshold.

16. The method of claim 15, further including, based on the computational burden not satisfying the threshold, executing a malware scanner with the CPU to perform the scan of the volume of data.

17. The method of claim 15, further including, based on the computational burden satisfying the threshold, providing a kernel corresponding to a malware scanner to the GPU to cause the GPU to perform the scan of the volume of data.

18. The method of claim 15, further including estimating the computational burden based on at least one of (1) a number of files or objects represented by the volume of data, (2) respective sizes of the files or the objects, (3) respective types of the files or the objects, (4) a current computational burden on the CPU, (5) a current computational burden on the GPU, or (6) a hardware capability of a compute platform including the CPU and the GPU.

19. The method of claim 15, further including, based on the computational burden satisfying the threshold:

partitioning the volume of data into a first portion and a second portion;

providing a kernel corresponding to a malware scanner to the GPU to cause the GPU to scan the first portion of the volume of data; and executing the malware scanner with the CPU to scan the second portion of the volume of data.

20. The method of claim 19, wherein the first portion of the volume of data is larger than the second portion of the volume of data, and the method further includes providing the kernel to the GPU to cause the GPU to scan the first portion of the volume of data based on determining that the GPU will scan the first portion of the volume of data more efficiently than the CPU.

* * * * *